United States Patent [19]

Boots

[11] 3,977,524
[45] Aug. 31, 1976

[54] AUTOMATIC CELERY SIZER AND SORTER

[75] Inventor: Vernie A. Boots, Belle Glade, Fla.

[73] Assignee: A. Duda & Sons, Oviedo, Fla.

[22] Filed: May 20, 1974

[21] Appl. No.: 471,589

[52] U.S. Cl. ............................ 209/74 M; 209/88 R; 209/82
[51] Int. Cl.[2] ...................... G01B 5/02; B07C 5/04
[58] Field of Search ................ 209/74 R, 74 M, 80, 209/82, 88 R, 90

[56] References Cited
UNITED STATES PATENTS

| | | | |
|---|---|---|---|
| 2,689,647 | 9/1954 | Hofstetter............................ | 209/90 |
| 2,791,330 | 5/1957 | Carlson............................ | 209/88 R |
| 2,901,105 | 8/1959 | Harder............................ | 209/88 R |
| 2,990,965 | 7/1961 | Smoll et al.................. | 209/74 R X |
| 3,080,052 | 3/1963 | Hanbury...................... | 209/88 R X |
| 3,080,659 | 3/1963 | Wolford...................... | 209/88 R X |
| 3,237,764 | 3/1966 | Kochalski.................. | 209/88 R X |
| 3,259,240 | 7/1966 | Schneider............................ | 209/74 |
| 3,455,442 | 7/1969 | Buist................................ | 209/74 |
| 3,539,006 | 11/1970 | Hanna............................... | 209/88 R |
| 3,862,496 | 1/1975 | Rysti et al........................ | 209/82 X |

*Primary Examiner*—Robert B. Reeves
*Assistant Examiner*—Joseph J. Rolla
*Attorney, Agent, or Firm*—Julian C. Renfro

[57] ABSTRACT

Apparatus for sizing and sorting celery stalks, plants, produce, and similar articles into groups of like sizes automatically, rapidly, and without damage to such articles. Articles to be sized are carried by an endless conveyor to a measuring or sizing station, where a succession of sizing arms contact each successive article. Each successive sizing arm moves upward in proportion to the average diameter of the particular article it encounters, thereby providing a measurement of size group to which that article belongs. If sorting is to be accomplished, each such measurement may be temporarily stored in a mechanical memory on a rotating disk and read out by a control device after a selected time delay. After the measurement operation the conveyor carries the articles to collecting stations, with there being separate collecting stations provided for each of several desired size groups. The rotating disk and read out operations are synchronized to cause the read out signal to control kick off means to remove the measured article belonging to a particular size group from the conveyor at the exact time such measured article arrives at the appropriate collecting station. Auxiliary memory storage and control apparatus is provided for use with automatic packing equipment.

20 Claims, 24 Drawing Figures

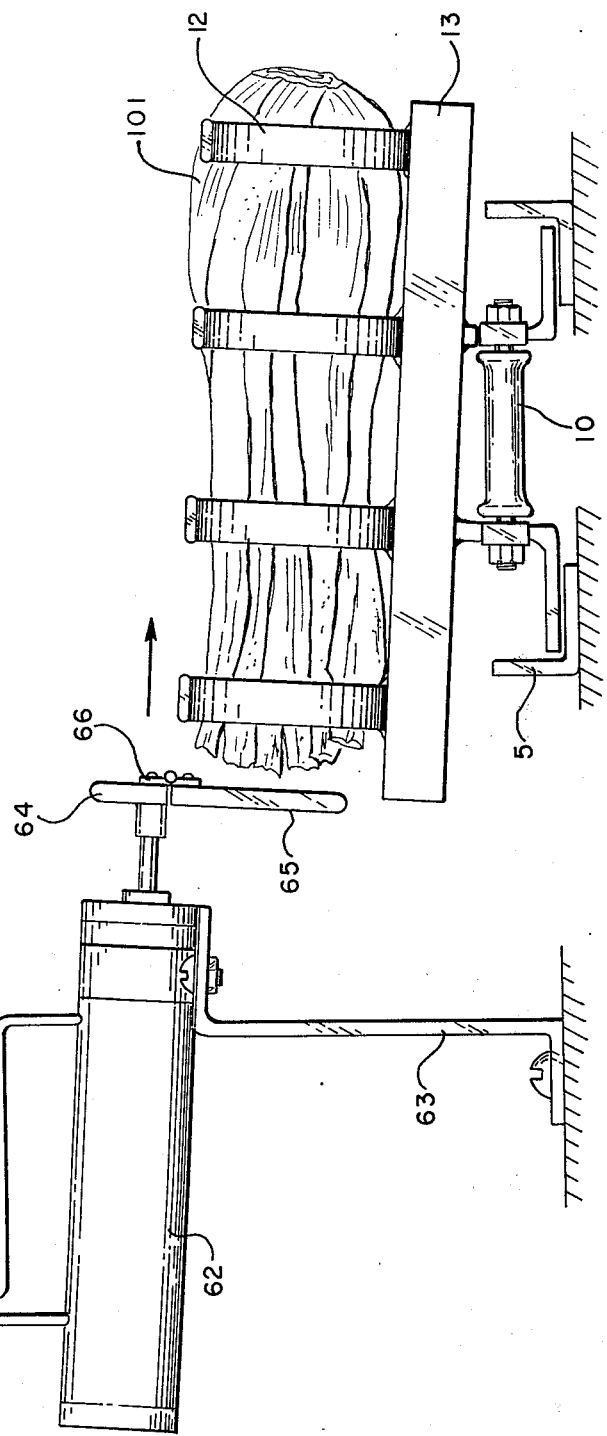

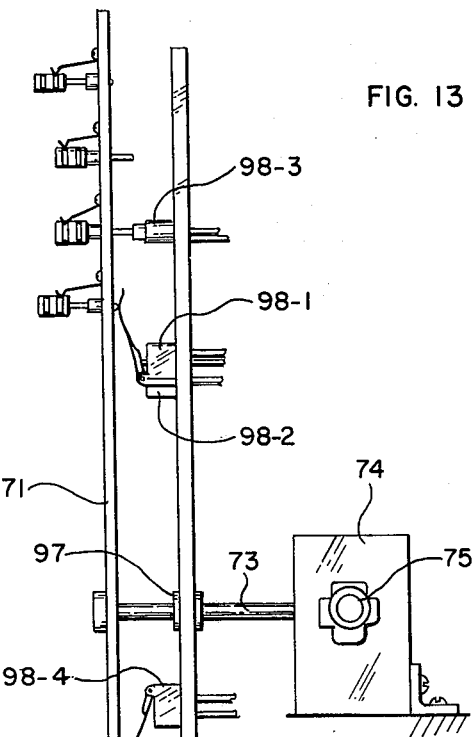
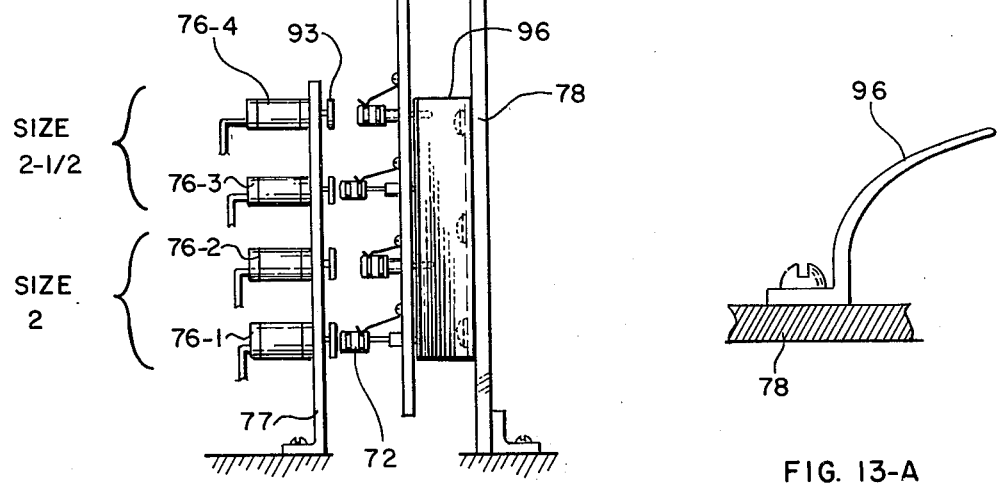
FIG. 13
FIG. 13-A

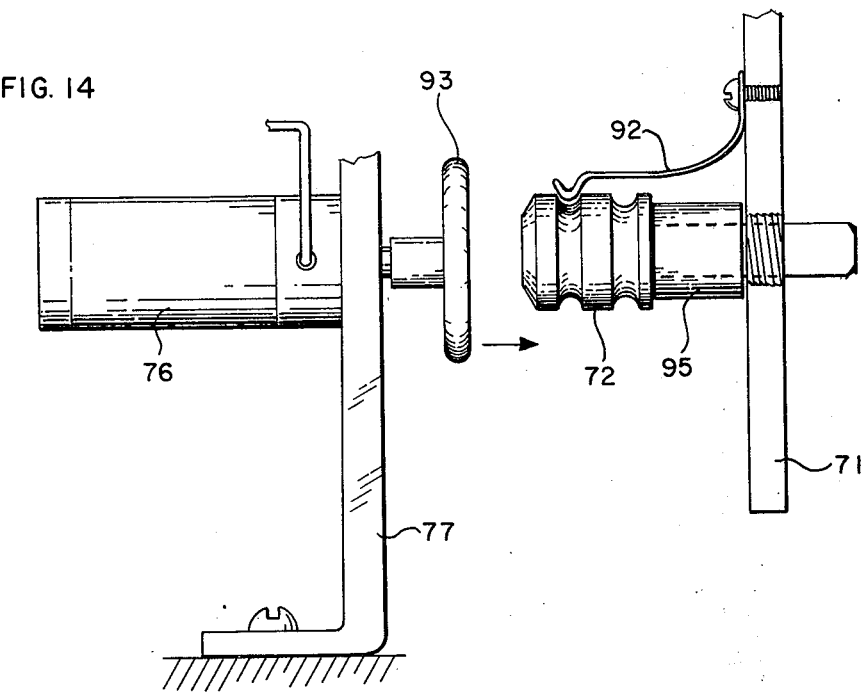
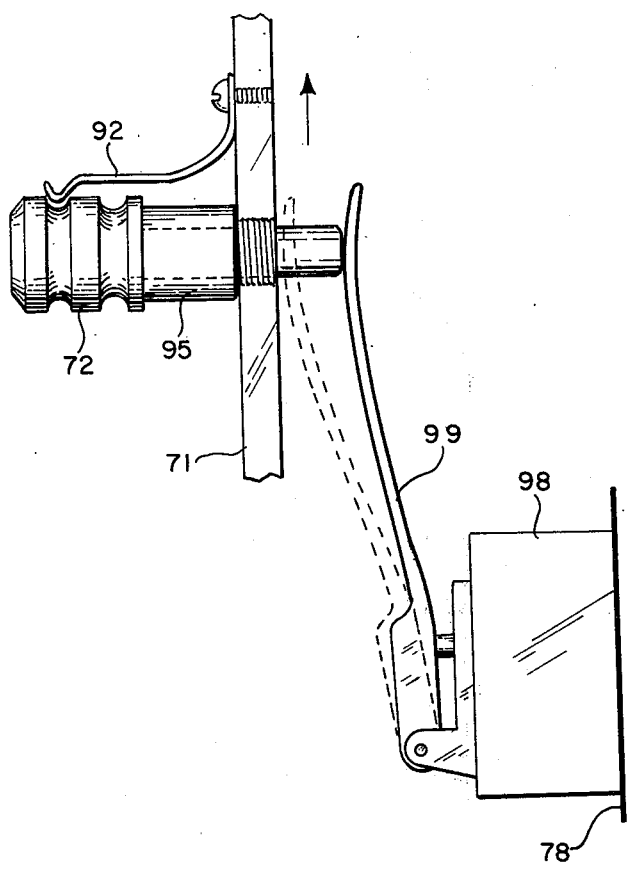

FIG. 15
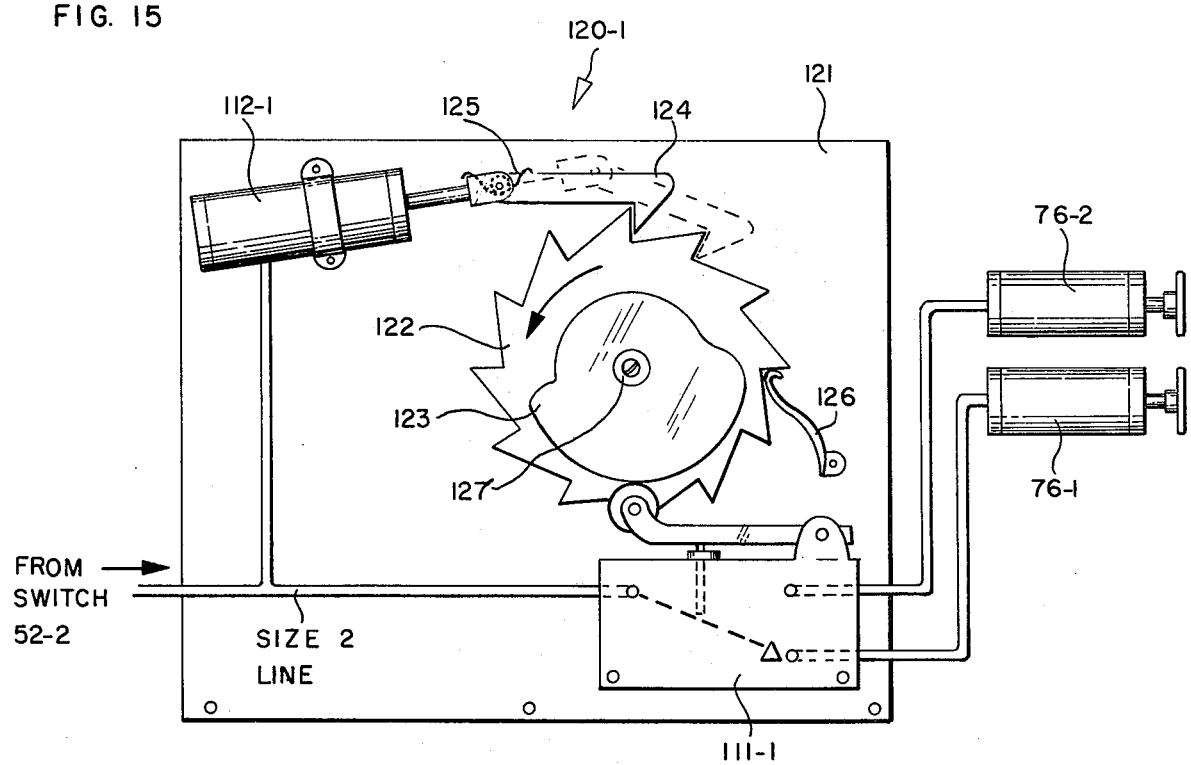
FIG. 15-A
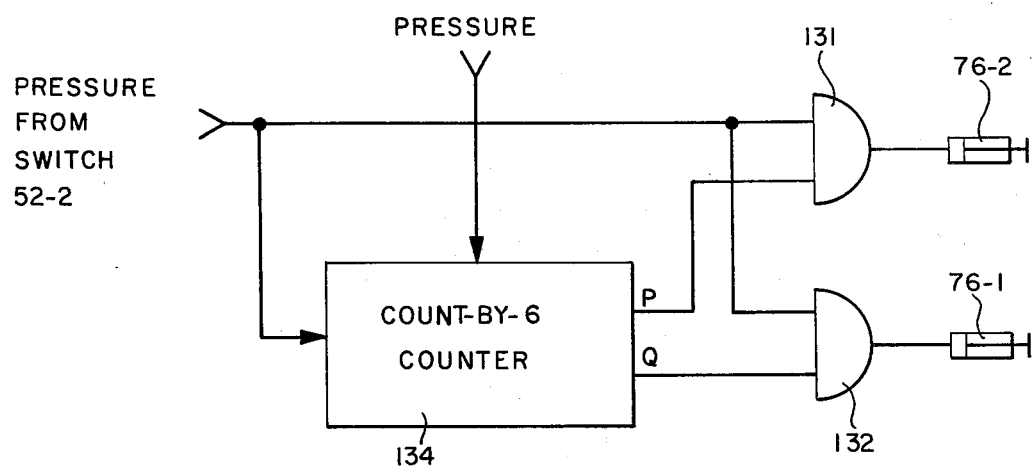

FIG. 21

| | 1 1/2 | 2A | 2B | 2 1/2A | 2 1/2B | 3A | 3B | 4 | OPERATION |
|---|---|---|---|---|---|---|---|---|---|
| SWITCH 52- | 2 | 1 | 1 | 5 | 5 | 3 | 3 | 4 | MOMENTARY CLOSE |
| DISC POINT NO. | 4 | 6 | 6 | 15 | 15 | 10 | 10 | 14 | DELAY PERIOD |
| SWITCH 111- | | 1 | 1 | 2 | 2 | 3 | 3 | | SELECT A OR B |
| RAM 76- | | 1 | 2 | 3 | 4 | 5 | 6 | 7 | MOMENTARY EXTEND |
| RAM 112- | | 1 | 1 | 2 | 2 | 3 | 3 | | MOMENTARY EXTEND |
| SWITCH 98- | | 1 | 2 | 3 | 4 | 5 | 6 | 7 | BRIEF CLOSURE |
| DISC POINT NO. | | 7 | 13 | 10 | 16 | 27 | 33 | 37 | DELAY PERIOD |
| RAM 113- | | 1 | 2 | 3 | 4 | 5 | 6 | 7 | EXTEND, THEN RETRACT |
| SWITCH 114- | | 1 | 2 | 3 | 4 | 5 | 6 | 7 | MOMENTARY CLOSE |
| PILOT VALVE 61- | 1 | 2 | 3 | 4 | 5 | 6 | 7 | 8 | MOMENTARY OPERATE |
| RAM 62- | 1 | 2 | 3 | 4 | 5 | 6 | 7 | 8 | EXTEND, THEN RETRACT |
| KICK-OFF STATION | S-4 | S-13 | S-19 | S-25 | S-31 | S-37 | S-43 | S-51 | STALK KICKED OFF |

AUTOMATIC CELERY SIZER AND SORTER

BACKGROUND OF THE INVENTION

1. Field of Invention

My invention relates to apparatus for automatic sizing and sorting of celery stalks, plants, and similar articles having somewhat irregular diameters and of a slightly compressible nature.

2. Description of the Prior Art

Celery sizing and sorting is most commonly accomplished manually by the use of a comparatively large number of workers. A worker is trained to examine each stalk of celery coming along a conveyor belt and to judge the size of such stalk. He places each stalk in a container in accordance with its size. Celery is customarily sized by numbers, such as 1½, 2, 2½, 3, and 4 with these numbers representing the number of dozen stalks that can be fitted into a standard celery container, such as a crate or carton. While there are celery stalks larger and smaller than these sizes, the present invention is concerned primarily with these five sizes.

With respect to use of workers for sizing and sorting, it has been found that a requirement for rapid operation often results in poor sizing accuracy. Furthermore, the available labor pool for such workers has been decreasing progressively over the past few years. Consequently, a requirement exists for automatic equipment to rapidly and accurately size and sort celery stalks, and similar articles.

Various commercially available devices for sizing articles have been tried for sizing celery stalks. These devices invariably use electronic and electrical switches and devices. However, the presence of washing water, spray, moisture and general wet conditions in celery packing plants have caused such electrical devices to be unreliable and potentially hazardous. An example of an electrical sizer is shown in Buist et al, Pat. No. 3,455,442. In that invention, the stalks are carried along by two spaced conveyor Vee-belts riding on pulleys. The stalks pass under a series of height detectors, each set for a different size. The detector arm, when moved to its set height, closes an electrical switch which energizes a solenoid. The solenoid kicks the stalk so that it falls between the two Veebelts, into means for distributing the stalks to the proper crates. This approach has several disadvantages which are overcome in the present invention. The rigid height-measuring arms may cause inaccurate sizing due to unsymmetrical stalks. No method of holding the stalks in position on the conveyor Veebelts are shown, and electrical contacts are used.

Several other sizing or sorting devices are known but none of these are completely satisfactory for celery sizing. Eggers U.S. Pat. No. 3,250,388 and Preu et al U.S. Pat. No. 3,241,666 teach apparatus for sensing the size of solid objects on a line or conveyor. The forces required in the sensing precludes the use of these devices for celery or other easily damaged, compressible material.

An apparatus by Goodall, U.S. Pat. No. 3,645,394 for sorting and grading cut flowers, uses electrical contacts and solenoids for sorting according to stem lengths. U.S. Pat. No. 3,468,415 to Sarver is basically a simple sensor type device for sorting irregularly shaped items, and involves several rigid arms, electrical contacts, and a solenoid for kicking irregularly shaped objects off of a conveyor belt when they exceed a certain size.

Another approach attempted in the past has been to size and sort by weight. However, this method has proven to be inaccurate with the type of equipment capable of operating in the wet conditions present in celery packing plants.

My invention overcomes the various problems and limitations of these known prior art devices. As will be described in more detail hereinafter, I utilize air-operated relays, controls and actuators thereby providing high reliability, as well as safety in a wet environment. Stalks of celery are held in place in holders configured as metal baskets, obviating accidental dislodgement of stalks. Size is measured at one station by a soft flexible band that contacts the stalks at several points around the periphery thereby obtaining a good average of unsymmetrical stalks. Whereas most of the devices previously known utilize rigid arms, cams, levers, etc. in the sizing operation with an inherent danger of bruising or damaging celery stalks, the use in accordance with this invention of a soft, flexible nonelastic band for sizing prevents such damage.

SUMMARY OF THE INVENTION

My invention provides apparatus for automatically sizing and sorting celery stalks, other plants and similar articles. An endless conveyor has closely-spaced upstanding U-shaped metal members attached laterally across the conveyor so as to form a simple open-ended basket of such size as to hold celery stalks of all sizes, including the largest size. These article holders may be loaded with stalks manually and carried through the usual washing and trimming operations. To measure the size of stalks, the conveyor moves the baskets beneath a wheel-like member or disc having a multiplicity of spoke-like arms. The plane of the disc is parallel to the conveyor belt. At the outer end of each arm a U-shaped yoke is mounted having a flexible yet nonelastic band attached between the yoke ends. Each arm is free to move radially outward or inward with respect to the axis of the disc, and is spring-biased in the radially-outward direction. As the conveyor moves, the disc rotates so as to move the arms in essential synchronism with the longitudinal movement of the stalk-carrying baskets. That is to say, as an arm comes around, the yoke straddles the celery stalk in its basket with the slack, flexible band contacting the stalk. As that stalk is moved along the conveyor, that arm leaves the stalk, and the next arm and yoke contact the next stalk on the belt, and so on. When the yoke and band of an arm is in contact with a celery stalk, the height of the stalk pushes the arm radially inward (upward), with the maximum radially inward retreat of the arm occuring when the mid-point of the basket is directly below the center of the disc. The conveyor moves at a rate of approximately 60 feet per minute, or 90 buckets per minute resulting in a measurement each ⅔ seconds.

The stalk-contacting arm in moving upward pushes a measuring rod upward, and a ratchet device retains this measuring rod at the highest point reached, which point is of course proportional to stalk diameter. As should therefore be apparent, the larger the stalk, the higher the measuring rod will be pushed. The ratchet device and rod may thus serve as a temporary memory or storage of each successive stalk size to be used subsequently for sorting the stalks into groups of similar size. It is to be understood that each of the multiplicity of arms of the wheel or disc has its associated measuring rod and ratchet device. The stored size will be subsequently read out and the ratchet will have been reset to neutral by the time a particular arm has made a 360° revolution and is in position to contact another stalk in order to perform another measurement.

In accordance with a particular application of my invention, it is desired to sort celery stalks into five size groups. Therefore, the measuring rod and ratchet device is provided with five ratchet notches corresponding to the desired groups. To perform the sorting operation, I have provided in accordance with one embodiment, five circumferentially deployed pneumatic limit switches mounted on a stationary plate, parallel with and immediately behind the rotating disc. Each switch is positioned radially on the plate with respect to the axis of the rotating disc so that one of the five switches will be contacted by a cam on the end of the measuring rod for each ratchet notch position. The five limit switches are spaced around the plate with respect to the circumference of the disc so as to require a different arc of rotation of an arm and measuring rod cam for contact with the switch for each size group. As the disc rotates, the measuring rod cam will thus contact and actuate the switch associated with the size group corresponding to the height stored by the ratchet and rod.

Each switch is connected directly or indirectly to a kick-off ram, typically air operated, which is located at a subsequent, stalk-collection station through which the conveyor basket passes after passing the measuring station. The position of the switch and the location of the kick-off ram for each size group are selected so that the switch is actuated at the exact time that the celery stalk arrives at the collection station. Thus, all stalks falling within the same selected size range will be kicked off of the conveyor at the same station. Containers may be positioned adjacent to each collection station to collect stalks belonging to the various size groups.

Instead of placing crates, or other containers adjacent to the collection stations, an alternative arrangement involves the use of additional conveyor belts positioned at right angles to the basket conveyor. Stalks of each size group are kicked onto separate belts and carried to a more convenient location for packing in crates, cartons or other such containers.

In addition to the basic mode of operation of my invention described hereinabove, I have provided certain other useful and advantageous apparatus to achieve improved packing of medium size stalks. It is desirable to alternate the placement of the butt-ends of the layers of celery stalks in the containers or crates to allow higher packing density. To this end, I may provide two collection stations for each of the three intermediate size groups and two conveyor belts for each such group. Auxiliary memory or storage devices are provided to cause alternate groups of stalks of a given size group to be kicked off at each of the two collection stations for that size group, onto two separate conveyor belts. This simplifies the operation whereby alternate layers of stalks have their butt ends reversed during the packing procedure.

For use with certain automatic packing operations outside the scope of my present invention, I can utilize trays to accumulate each group of sorted stalks. When such a tray at a first station is filled with stalks having their butt ends aligned, it is automatically transferred to a container to form a layer of stalks. Next, a tray is filled at the second collection station for that size group, thus giving sufficient time for the container at the first station to be turned so that the next layer will be added with the butt ends opposite to those of the preceding layer. These operations are repeated sequentially, thus resulting in the container at each station being filled with layers of stalks in which the butt ends of a given layer are reversed from that of the layer above and the layer below.

It is an important feature of my invention that the article measuring means, memory means, timing or control means, and kick-off or article removal means all utilize pneumatic devices for control and operation. This feature provides safe, reliable and positive action in an environment involving water, water vapor and dirt, without the problems inherent in operation of electrical contacts, wiring, electronic circuits and similar equipment in such an environment. Another feature is that the measuring and sorting operations involve article-contacting means having a soft, flexible band that avoids damage to the stalks contacted, and at least partially conforms to the irregularly shaped stalks. The kick-off ram is arranged to contact the trimmed top or leaf end of the stalk; therefore, bruising of the stalks is minimized. Furthermore, the normal action of the air ram used is to start its stroke gradually and to increase its velocity sharply toward the end of its stroke. This action provides additional protection against damaging the stalk limbs, and is to be contrasted with the sharp blow the stalk would have received had an electrical solenoid been used.

Therefore, it is a primary object of my invention to provide apparatus for automatically and rapidly measuring and sorting celery stalks and similar articles accurately into several selected size groups.

It is another object of my invention to minimize the utilization of manual labor for sizing and sorting celery stalks and similar articles, with its inherent inaccuracies and diminishing availability.

It is a further object of my invention to automatically collect and transport such articles belonging to each size group to a point for packing into containers such that a given container will contain only articles of one size group.

It is another object of my invention to provide apparatus involving a single measuring station, associated with which is a conveyor belt that serves to carry the articles through the station, which apparatus may have a memory device to store the measurements made at the measuring station so that they may be used in a subsequent sorting operation.

It is yet another object of my invention to provide apparatus for sorting celery stalks belonging to a size group so that such stalks can be subsequently packed in a container with alternate layers of the stalks having their butt ends reversed with respect to the adjacent layers.

It is still another object to provide measurement and control devices which are highly reliable and safe to operate, even in a wet environment.

It is yet a further object of my invention to provide apparatus for accurately sorting celery stalks and similar articles without causing bruising or other damage.

These and other objects, features and advantages of my invention will be explained with reference to the following figures of drawing wherein:

FIG. 7 is a view to a large scale of a typical kick-off ram in position for ejecting a celery stalk from its basket on the conveyor;

FIG. 10A is a side view of the apparatus of FIG. 10;

FIG. 13 is a side view, to a larger scale, of an auxiliary memory and timing wheel, showing the stationary plate having readout switches mounted thereon;

FIG. 13A is a fragmentary view to a large scale of a peg reset cam;

FIG. 14 is a detail view of a typical memory peg and its setting ram, also to a large scale;

FIG. 15 is a front view of a mechanical counter and switch used to control setting of desired memory pegs;

FIG. 15A is a block diagram of an alternative counter and switch using fluidic-type logic;

FIG. 16 is a detail of the readout function of memory peg and readout switch;

FIG. 21 is a table listing the devices and operational sequence used in the schematic diagram of FIG. 20.

DETAILED DESCRIPTION

In FIGS. 1 through 9, I have illustrated the elements of a simplified implementation of my invention that serve to explain the basic operation thereof. In this implementation, I automatically measure and sort celery stalks into five size groups. One collecting station is provided for each of the five size groups. This simplified version can be built economically and is well suited for use in a small packing plant. For the large packing plant utilizing automatic equipment for such additional operations as sleeving and packing in containers, I illustrate a preferred embodiment of my invention in FIGS. 11 through FIG. 21. In this latter version, more than one collection station can be provided for certain size groups.

Figure 1:
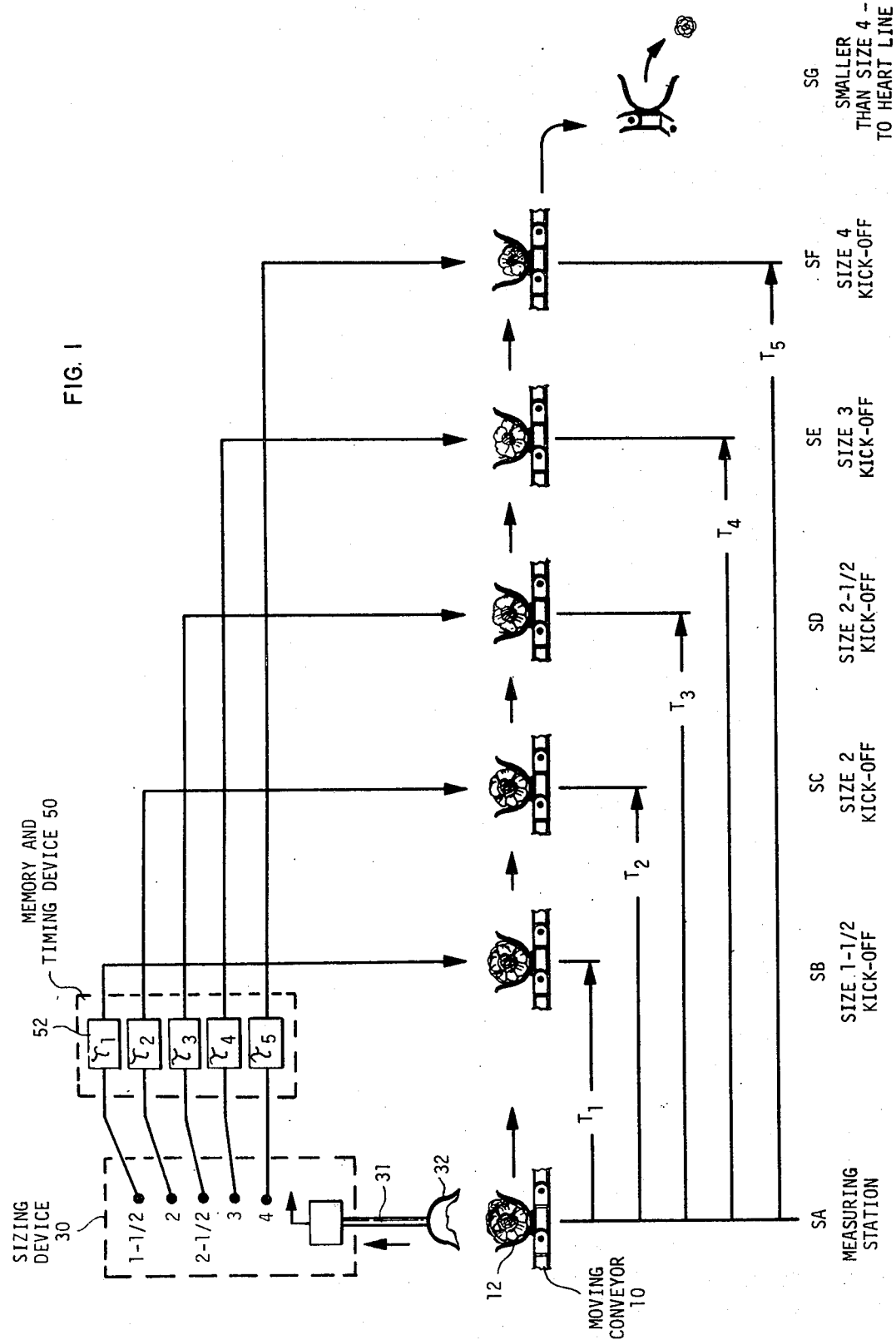
FIG. 1 is a schematic diagram illustrating the basic principles of operation by the use of a simplified version of my invention, which is not to scale.

Referring now to FIG. 1, I have shown a schematic diagram which illustrates the basic operational theory of the simplified version of my invention. A moving chain type endless conveyor 10 is provided with a series of closely spaced article holding means 12, such as baskets configured such that each basket holds a single celery stalk. In FIG. 1, one such basket 12 is shown in a plurality of positions, whereas in FIG. 9, a multiplicity of baskets 12 are shown.

FIG. 1 shows basket 12 being carried by conveyor 10 from station SA to station SB, from station SB to station SC, and so on to station SF as indicated by the arrows. It is to be noted that Station SA is a measuring station that utilizes a measuring device 30. While not shown in the schematic, the sizing device 30 is typically of rotary construction having a multiplicity of radial arms as may be seen in FIGS. 2, 9 and 10. The spoke-like arms can move radially and are each normally held in an outward extended position by compression spring. Such an arm 31 is indicated in FIG. 1 projecting from device 30, with this arm having a yoke 32 that contacts the celery stalk in the manner shown in FIG. 2. By moving upward, this arm 31 activates a measuring or sizing device indicated schematically in FIG. 1 by the solid-point arrow and sequence of points 4, 3, 2½, 2, and 1½ disposed in block 30. When a stalk in basket 12 arrives at station SA, yoke 32 is forced upward for an extent determined by the average diameter of the stalk. The measuring device 30 will contact point 4 if the stalk size will allow not more than four dozen but yet more than three dozen celery stalks to be packed in a standard crate or container. If a larger stalk size is involved, such that there are not more than 3 dozen, yet more than 2½ dozen to the container, point 3 is contacted, and so on to the largest size stalk. The largest size to be measured or sized is 1½. FIG. 1 is, of course, not to scale.

Although the size measurement operation just described is a distinct facet of my invention, it is typical for this to be followed by a sorting operation. The memory and timing device 50 indicated in FIG. 1 serves to store the information gleaned during the sizing operation, for use during the sorting procedure. The device 50 basically involves a storage of the measurement, a timing operation, and a control operation after the appropriate time delay.

For example, I will assume that a stalk in basket 12 arrives at measuring station SA and is of size 1 1/2. Therefore, the sizing or measuring device 30 will contact point 1 1/2 which is associated with a timing device 52 having a timing period of $\tau 1$ seconds. As the conveyor 10 carries the basket 12 with stalk from station SA to station SB, the transit time is $T_1$ seconds. Station SB contains a pneumatic ram device (not shown in FIG. 1) that will, when energized, push the stalk out of the basket 12. Advantageously, $\tau 1$ and $T_1$ are equal periods, so therefore, the timing device 52 will have an output at the exact time that the stalk arrives at size 1½ collection station SB. This output serves to energize the kick-off ram device, knocking the stalk off of conveyor 10 into an appropriate container.

Similarly, collection stations SC, SD, SE and SF have transit times $T_2$, $T_3$, $T_4$ and $T_5$ respectively. These periods correspond to the periods of the remaining timing devices in block 50; $\tau 2$, $\tau 3$, $\tau 4$, and $\tau 5$. In this simplified version of my invention, stalks that fall within these size groups will be kicked off at the proper stations. It may thus be seen that the memory and timing device 50 is properly regardable as a control means for sorting the celery stalks.

For stalks smaller than size 4, none of the measuring points will be set and these stalks may be dumped by gravity at the end of the conveyor 10, to be used in other products.

As a timing device in block 50 has an output, energizing its associated kick-off ram, the size stored in the memory 50 is effectively erased. It should be understood that the sizing device 30 is arranged so as to measure each successive stalk that passes through station SA, and to store each size in the memory 50. It will be explained in detail hereinafter how as many as 15 sizes or more can be in storage 50 at a given time.

Having hereinabove described the basic operation of my invention, I will now explain other details of the simplified version for each component or element of my invention mentioned above, as well as other advantageous features and alternative implementations.

Figure 2:
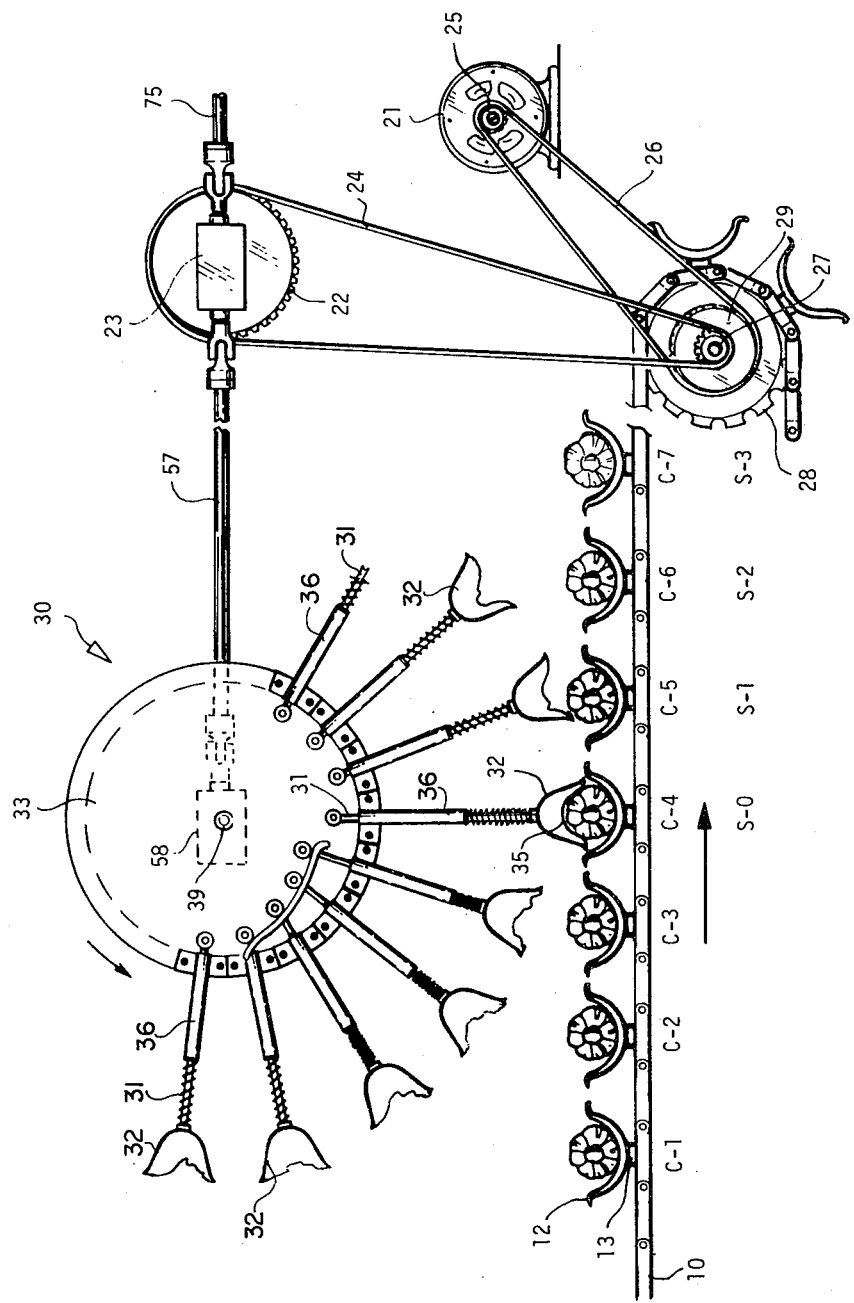
FIG. 2 is a partial view of the sizing and memory wheel, shown making measurements on stalks being carried by the conveyor, with this view revealing the system drive mechanism.

Turning to FIG. 2, a section of conveyor 10 is illustrated with a sequence of baskets 12 containing celery stalks C-1 through C-7. The sizing device is revealed to take the form of a wheel or disk 33 rotatable about a center shaft 39, with a number of spoke-like arms 31 equipped with yokes 32 being disposed in spaced relation about the periphery of the disk. A motor 21 drives conveyor 10 by means of sprocket 25, chain 26 and sprocket 29. Sprocket 29 is attached to a pintle size 85-8 tooth drive sprocket 28 that engages the links of conveyor 10. Movement of conveyor 10 in this instance is to the right, as shown by the straight arrow, and may be at a speed of 60 to 90 feet per minute. The conveyor for example may be made up from a series of Moline 85 links, each of a length of about five inches, with stalk basket 12 on cross bar 13 being mounted on every other link. Sprocket 27 attached to sprocket 29 drives a gear box 23 via chain 24 and sprocket 22. Drive shaft 57 from gear box 23 drives gear box 58 which causes disk 33 to rotate counterclockwise, as indicated by the curved arrow. The ratios of the sprockets and gear boxes are selected so that the yokes 32 mounted at the ends of arms 31 of the disk 33 rotate at a speed to match the linear speed of conveyor 10, and to maintain a precisely controlled relation with the baskets 12 mounted thereon. Gear box 23 can also power drive shaft 75 that may be used to drive certain ancillary apparatus.

FIG. 2 shows celery stalk C-4 being sized at a station designated station S-O. Band 35 is in contact with celery stalk C-4, pushing yoke 32 upward. Stalk C-5 has moved to the station designated S-1, and its yoke 32 is just leaving contact, while stalk C-6 has moved to station S-2 and its yoke is completely clear. On the other hand, stalk C-3 is moving toward measuring station S-O and is due to contact its yoke shortly. Thus, the rotation of disk 33 is exactly synchronized so that a centerline of a yoke 32 is aligned with the centerline of a basket 12 at measuring station S-O for each successive basket. This action is, of course continuous.

Figure 4:
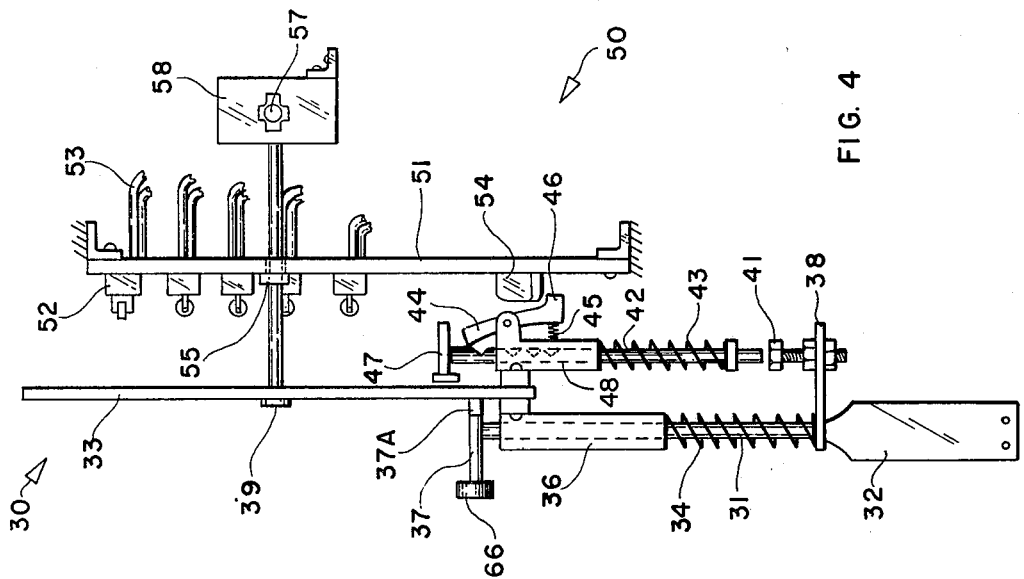
FIG. 4 is a side view of the sizing and memory wheel of FIG. 3, with this view revealing the readout switches.
Figure 3:
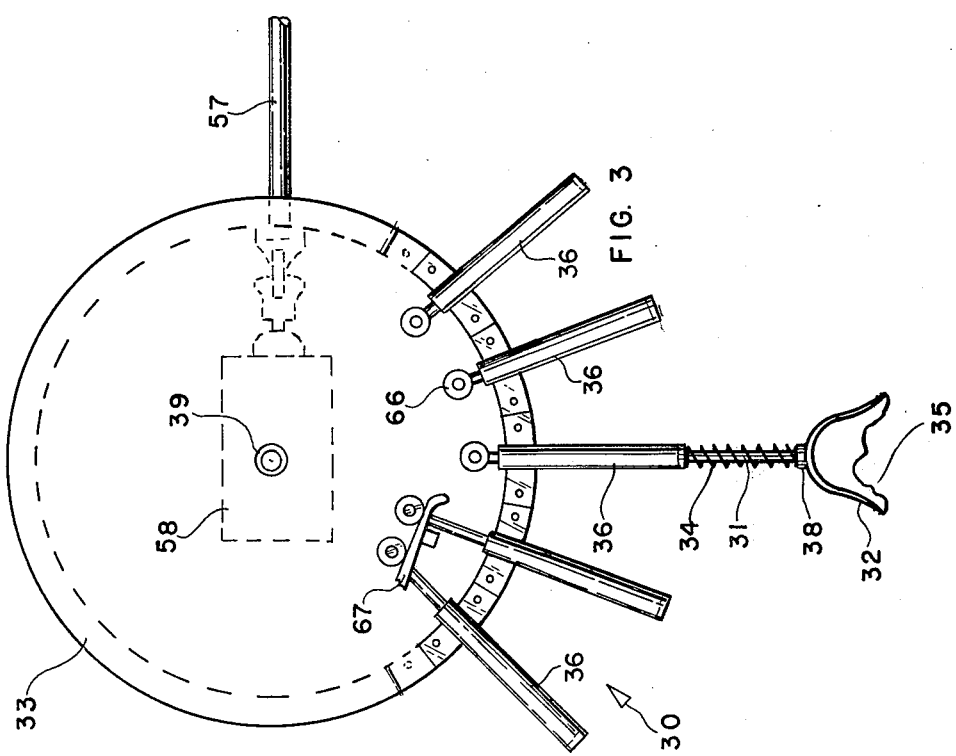
FIG. 3 is a partial view of the sizing and memory wheel, to a larger scale.

Referring now to FIGS. 3 and 4, and initially to FIG. 3, a typical embodiment of a sizing device 30 is there revealed to involve disk 33 rotatable about shaft 39, which disk is driven in rotation at the desired speed by means of the drive train involving shaft 57 and gearbox 58. A plurality of sleeves 36 are welded or otherwise secured in spaced relation around the periphery of the disk 33, and slidably disposed in each sleeve is an arm 31. Each arm is biased outwardly by a respective compression spring 34, and each arm is equipped at its outermost portion with a yoke 32. Each yoke has a soft but non-extensible band 35 extending thereacross, which band is designed to actually contact the celery being sized. In the preferred embodiment, twenty arms 31 slidable in respective sleeves 36 are utilized, but a lesser number are being illustrated in the interests of clarity.

Each compression spring 34 serves to maintain its rod 31 fully extended with respect to its respective sleeve prior to making a size measurement. In accordance with an operation more fully explained hereinafter, each yoke 32 is caused to straddle a celery stalk carried by the conveyor 10. The flexible band 35 contacts and partially conforms to the shape of the stalk encountered, and in accordance with the size of the stalk thus contacted, the yoke 32 is pushed upward so as to cause a compression of spring 31. It should be noted that spring 34 causes the band 35 to apply moderate pressure against the stalk, advantageously compressing the individual limbs, thereby preventing false sizing as a result of an unsymmetrical or loosely-limbed celery stalk. Also, the flexible band 35 tends to produce an average size by conforming to irregular shaped stalks. Since band 35 is of soft, pliable material, no bruising or other damage to the stalks will occur. However, it is virtually inextensible, making the obtaining of consistently accurate results possible.

As best seen in FIG. 4, a metal block 37 is welded to the upper end of rod 31, which has a flat block 37A of nylon, plastic or the like cemented to its inner end and bearing against disk 33. This block 37 prevents the yoke 32 from rotating as it is pushed up during a sizing operation. As also seen in FIG. 4, a bar 38 welded or otherwise attached to the innermost end of yoke 32 and at right angles to rod 31 projects toward the memory device 50, this being provided for a purpose to be described shortly. The memory device 50 includes means for storing the height to which each rod and yoke is raised during the previously described stalk measuring operation.

Figure 5:
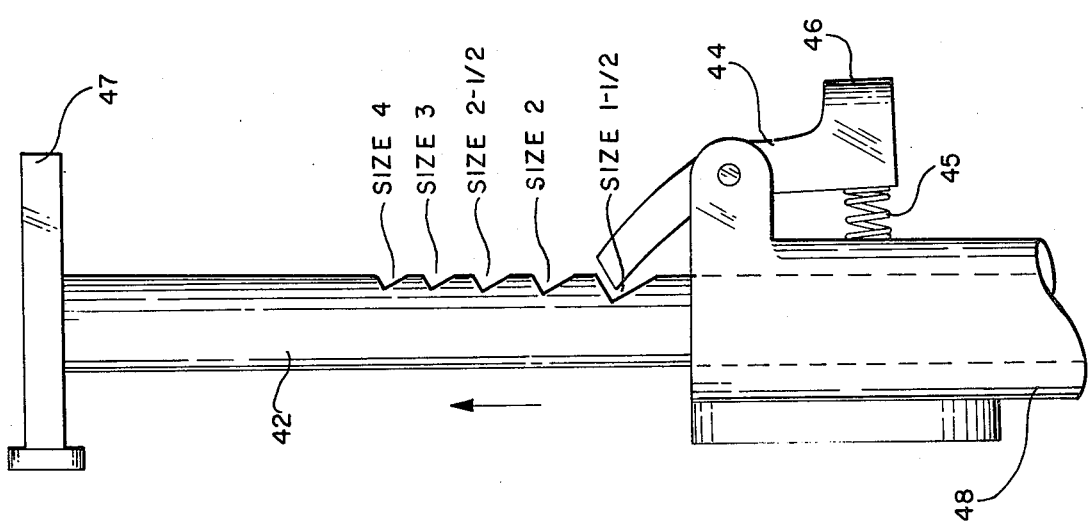
FIG. 5 is a large scale showing of the ratchet-type measuring rod utilized on the sizing and memory wheel for storing measurements.

With consideration of FIGS. 4 and 5, a sleeve 48 is attached to the periphery of disk 33 immediately behind each sleeve 36 of the sizing device, with each sleeve 48 containing a slidably disposed measuring rod 42. A compression spring 43 maintains each rod 42 completely extended prior to a measurement, but during a measurement such as described hereinbefore, an adjustable pusher 41 mounted on the aforementioned bar 38 contacts the lower end of rod 42. Thus, as a yoke 32 is pushed upward, its pusher 41 raises the respective rod 42 against spring 43. A plastic block 47 is attached to the upper end of rod 42 and prevents this rod from rotating when pushed upward. Block 47 also serves as a cam to operate pneumatic limit switches 52, as described more fully hereinafter.

The upper end of each rod 42 contains a series of notches, best shown in FIG. 5, with ratchet pawl 44 attached to the upper end of sleeve 48 engaging the notch in accordance with the size group to which a particular stalk of celery belongs. Pawl 44 is held in each notch encountered by spring 45. To allow the measuring rod 42 to thereafter be reset for a subsequent measurement, pawl 44 has been provided with a cam-like surface 46 opposite spring 45. Pressure on surface 46 at the appropriate time will release pawl 44, allowing spring 43 to return rod 42 to its neutral (radially extended) position.

Returning now to FIG. 4, a stationary plate 51 mounts apparatus to provide the timing function. Plate 51 has a bearing 55 at its center, supporting shaft 39. Five pneumatic limit switches 52 are disposed at certain specific points on plate 51, which switches may be a Versa Model No. 4631. Tubing 53 serves to connect a source of air pressure to each switch 52, and output signals to the kick-off rams described hereinafter. Typically, air pressures on the order of 35 psi may be used for operation of the rams.

Figure 6:
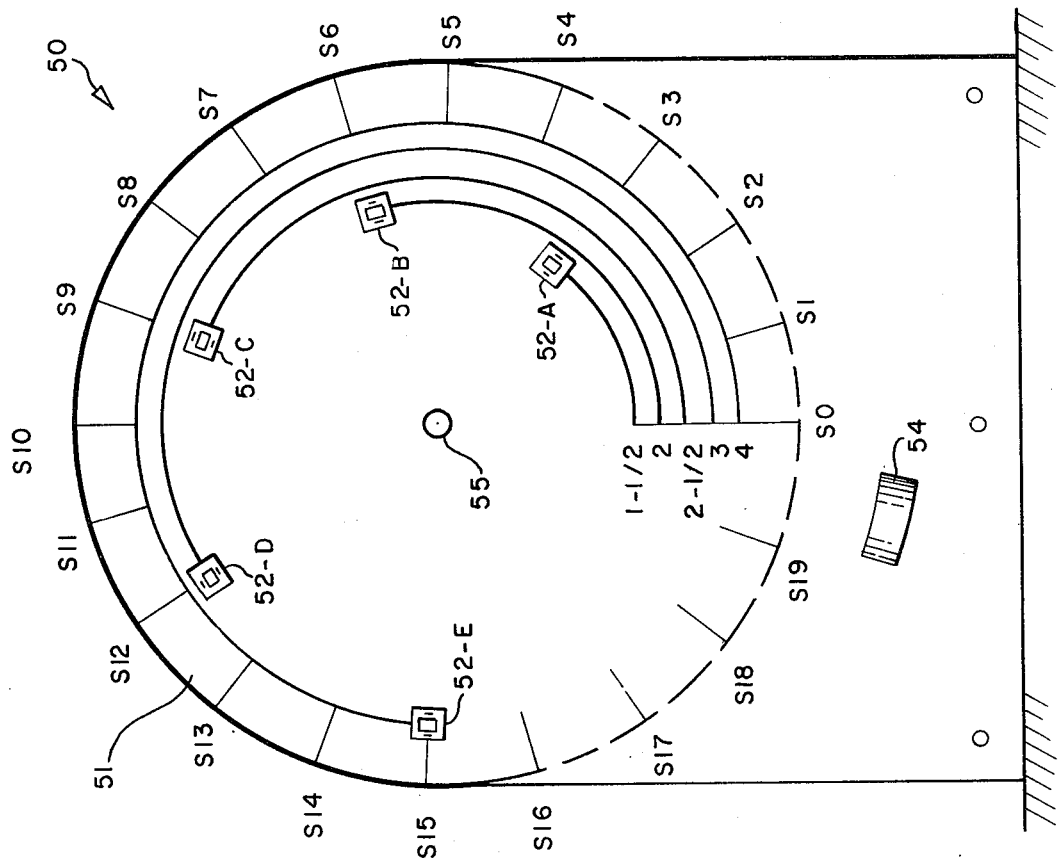
FIG. 6 is a front view of the storage readout plate, showing the locations of the readout switches.

FIG. 6 presents a front view of plate 51 as well as other details of the timing means. A series of points S-0 through S-19 may be noted around the periphery of plate 51 and correspond with certain discrete positions or stations of the stalk baskets 12 along conveyor 10. For example, station S-0 is the position of a stalk during the size measurement operation in which the mesuring rod 42 is raised to the appropriate notch.

As an illustration, assume that a size 1½ celery stalk is at station S-0. Cam block 47 of measuring rod 42 of FIGS. 4 and 5 will therefore be raised to the position marked by arc 1κ in FIG. 6. As disk 33 continues to rotate counterclockwise, cam block 47 follows the path of arc 1½ until it reaches limit switch 52-A. As will be noted, switch 52-A is attached to stationary plate 51 on a radial disposed at point S-3. It is most important to note that the stalk measured at station S-0 has been simultaneously carried by conveyor 10 to a certain point designated as station S-3. Thus, as cam block 47 contacts switch 52-A, an air pressure signal directly or indirectly operates a kick-off ram that serves to remove this particular celery stalk from the conveyor.

Figure 8:
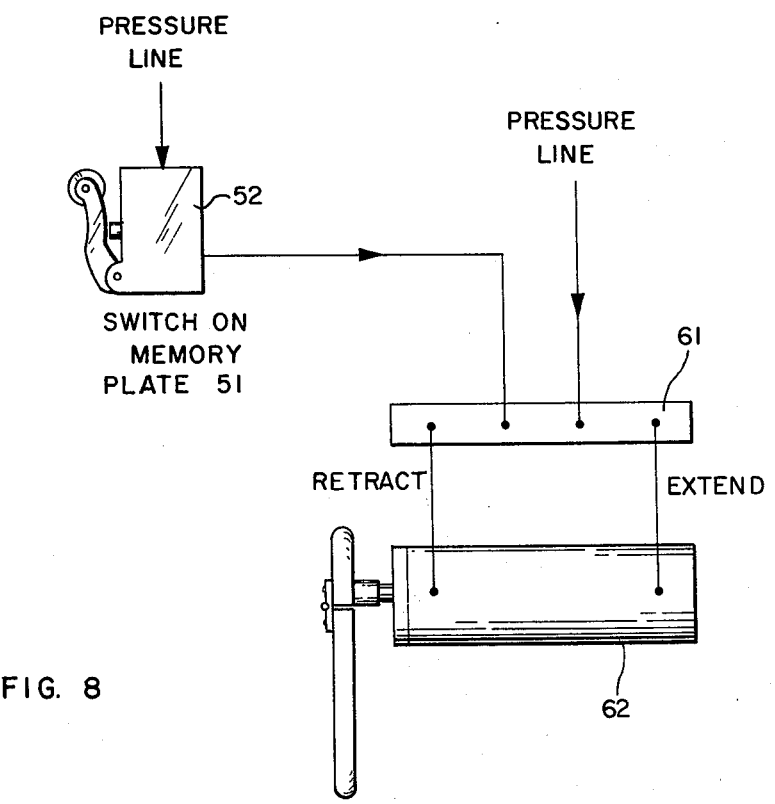
FIG. 8 is a schematic diagram of the air pressure controls for a kick-off ram.

FIG. 7 reveals a typical ram 62 which arrangement is revealed schematically in FIG. 8. In accordance with the basic theory of my invention, the ram associated with each celery size is disposed at the station at which celery of that size is to be removed, so in FIG. 9, a ram 62-A is located at station S-3. The signal from switch 52-A operates a respective pilot valve 61 of the type shown in FIG. 8, which may be a Versa MOdel VSP4302, which functions to admit air pressure to the "extend" port of ram 62-A. As seen in FIG. 7, push plate 65 attached to piston of ram 62 moves in the direction of the arrow, relatively slowly at first, thereby gently contacting the trimmed top end of celery stalk 101. The ram action then accelerates sharply at this point, and extends fully, causing the push plate to knock stalk 101 out of basket 12 into a container for size 1κ celery. It will be noted from FIG. 7 that basket 12 mounted on crossbar 13 slopes slightly with respect to kick-off ram 62, such slope assisting in a smooth ejection of stalk 101 from basket 12. As cam block 47 (FIG. 4) passes and thereafter releases switch 52-A due to continuing rotation of disk 33, pilot valve 61 (FIG. 8) energizes the "retract" port of ram 62 and the push plate is quickly retracted.

As seen in FIG. 7, push plate 65 is attached by hinge 66 to plate 64. Plate 64 is mounted to the piston rod of ram 62. In operation, extension of ram 62 causes push plate 65 to push stalk 101 out of basket 12 as described above; on the retract stroke, hinge 66 will allow push plate 65 to fold upward in case it strikes an arm of a basket 12, thus preventing damage to the apparatus.

While I have described the timing means depicted in FIG. 6 and elsewhere only in connection with a size 1½ celery stalk, it should be apparent that my apparatus is designed to work equally well with other sizes. For example, upon a size 2 celery stalk passing through station S-0, the cam block 47 of the measuring rod 42 involved in that instance will, as a result of the respective yoke 32 contacting that stalk, be raised to the position corresponding to the arc 2 in FIG. 6. As the disk 33 continues to rotate, counterclockwise in the exemplary embodiment, the cam block is eventually caused to contact limit switch 52-B, which is disposed at circumferential location S-6 in FIG. 6. Since the size 2 stalk under discussion has been carried forward by the conveyor during the rotation of the disk 33, this stalk will be at the proper location to be kicked off at conveyor station S-6.

A study of the drawings, and most particularly FIG. 6, will reveal that size 2½ measurements are relatable to arc 2½, with its limit switch 52-C being disposed at S-9; that size 3 measurements are relatable to arc 3, with its limit switch 52-D at S-12; and that size 4 measurements are relatable to arc 4, with its limit switch 52-E at S-15. The air ram 62 associated with each size is of course located at the like-numbered station disposed along the conveyor. Suitable double-acting air cylinders for use as kick-off rams 62 are available from Cylinder and Valves, Inc.

It is to be noted that the lengths of arc in FIG. 6 may be related with the time delays $\tau_1$ through $\tau_5$ of FIG. 1. Similarly, it may now be seen that stations SA, SB, SC, SD, SE and SF of FIG. 1 correspond to point S-0, S-3, S-6, S-9, S-12, and S-15 of FIG. 6. It is to be understood, however, that I can use any of the stations for any of the sizes. The stations illustrated have been selected for convenience and to allow room between kick-off stations for containers, for additional conveyor belts, or for certain automatic packing devices.

In FIG. 6, a cam block 54 near point S-19 may be noted. As disk 33 rotates, cam block 54 will be contacted by surface 46 of each pawl 44, thus successively resetting each measuring rod 42 to its neutral position in the manner previously mentioned.

Figure 9:
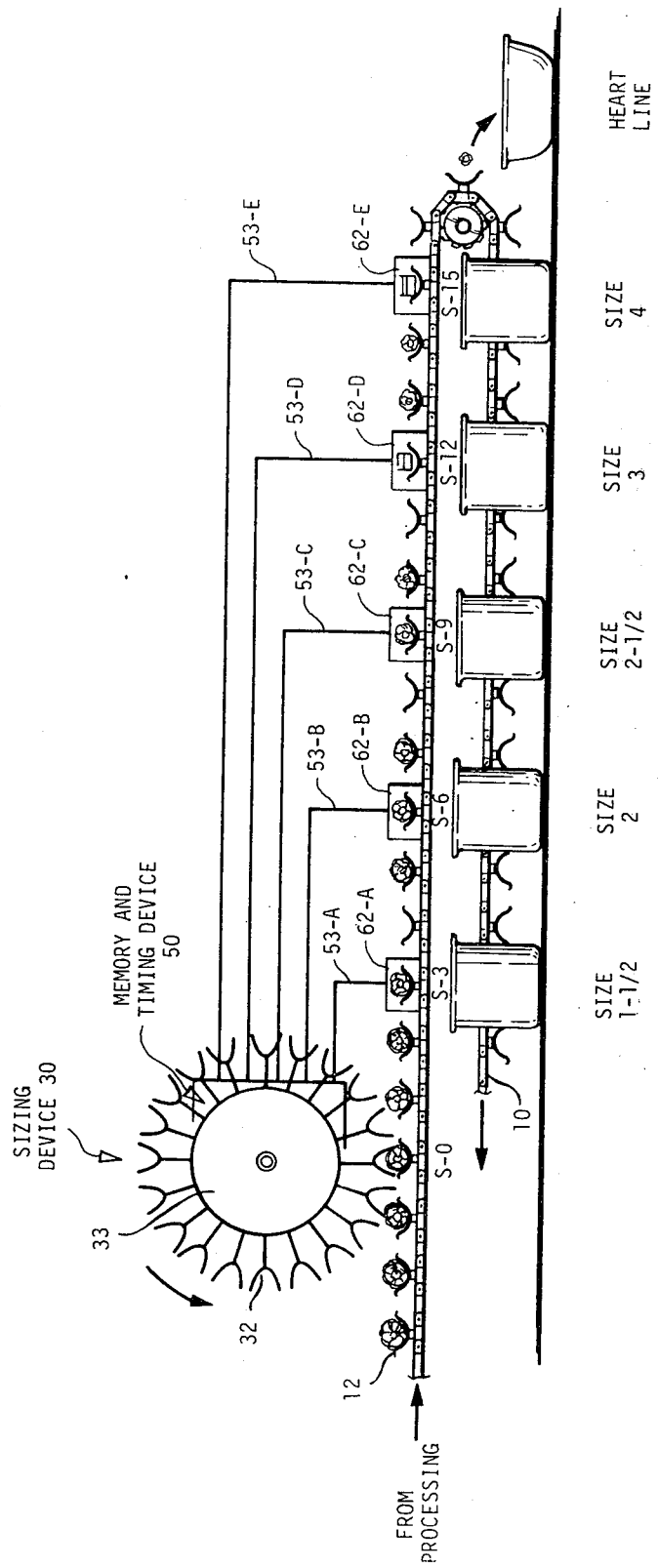
FIG. 9 is a schematic view of a complete sizing and sorting apparatus in accordance with a simplified version of my invention, including containers for packing.

FIG. 9 shows a schematic side view of a complete implementation of the simplified version of my invention. Conveyor 10 moves in direction of the straight arrows and is shown with baskets 12 as they arrive at measuring station S-0. Each basket contains a processed celery stalk. The sizing wheel 33 of sizing device 30 rotates in the direction of the curved arrow, in synchronous relation with the conveyor, thus causing the yokes 32 to successively contact the stalks in the baskets 12 as previously described. The measured sizes are stored in memory and timing device 50. Tubing 53 connects the time device 50 with five air-operated kick-off rams 62, which are located at stations S-3, S-6, S-9, S-12 and S-15. The tubing 53 and kick-off rams 62 for each station are further identified by letters A through E, which correspond to each associated switch 52 shown in FIG. 6. Thus, after a measurement is made at station S-0, the timing section of device 50 sends an air signal via tubing 53 to the corresponding kick-off ram 62 at the exact time that the measured stalk arrives at that collection station. Containers are shown in FIG.

9, placed at each collection station to receive the sorted stalks. Stalks smaller than size 4 continue on, fall off of the conveyor by gravity into, for example, a heart line container, and are subsequently utilized as material for celery hearts or other processed material.

While I have shown in this implementation the use of containers at the collection station to receive the sorted stalks, it is within the scope of my invention to pack the stalks at a remote location through the use of other apparatus, such as additional conveyor belts. For example, for each size celery, I can dispose a conveyor belt at right angles to and just below the conveyor 10 at each collection station. Thus, stalks kicked off of conveyor 10 will be collected on such belts used at the various kick-off stations, and be carried to remote packing points.

Having covered the basic aspects of my invention, I will now describe a variation in the design of sizing device 30 that I have found advantageous in certain instances. Returning to FIG. 2, it may be noted that a particular yoke 32 moving through an arc, initially contacts the stalk which that particular yoke 32 will measure, at a time occurring before the stalk arrives at station S-0. When the baskets 12 are closely spaced with respect to each other, I have found that on occasion, undesirable interference between a given yoke 32, and the respective stalk or basket can occur during this period of initial contact. This interference occurs partly from the fact that the yoke 32 is moving in an arc, and the basket 12 is moving linearly. Another cause is irregularly shaped stalks, such that the end of a yoke 32 can catch on a celery limb, resulting in damage and/or inaccurate sizing.

Figure 10:
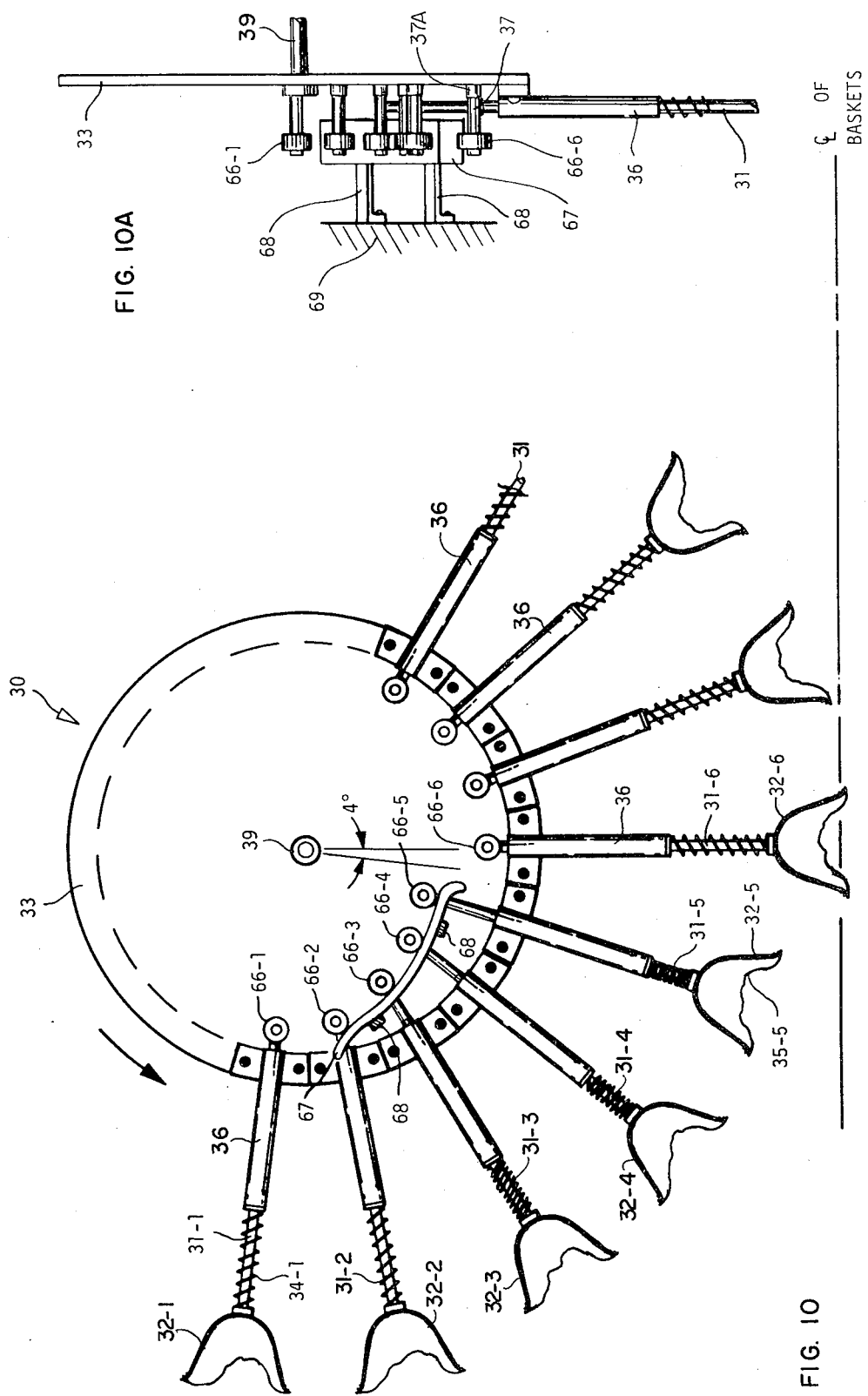
FIG. 10 is a partial view of the sizing wheel to a large scale, illustrated in conjunction with a device for preventing any interference of sizing arms with the baskets.

To prevent such interference, I have advantageously modified sizing device 30 to some extent, as shown in FIGS. 2 and 3, and to a greater extent as shown in FIG. 10, and in the partial side view, FIG. 10A. Referring to these latter two figures in particular, it is to be noted that I have added a small roller 66 to the front of each block 37. This roller can be for example, a common ball bearing assembly. To illustrate the operation of my interference eliminator, I have in FIG. 10 called out six of the sizing arms, and denoted the respective rollers as 66-1 through 66-6. A metal track 67 is disposed in front of disk 33 such that each roller 66 of each sizing arm will contact it as disk 33 rotates to bring the arms toward the measuring point. Track 67 is supported by brackets 68 anchored to stationary framework 69 (FIG. 10A) and is curved to cause each roller 66 to move to some extent toward center of disk 33 as disk 33 rotates.

In FIG. 10, sizing rod 31-1 is shown in the substantially horizontal position, and is held fully extended by spring 34-1. Sizing rod 31-2 has moved downward, with roller 66-2 contacting track 67 and thus moving somewhat radially toward center of disk 33. Rollers 66-3 and 66-4 have moved even further toward the center of the disk 33. As illustrated, rod 31-5 has been moved by its roller 66-5 into a position such that it will properly contact a stalk, which is to say, the action of roller 66-5 on track 67 has lifted the yoke 32-5 high enough to be completely clear of the stalk in basket 12, thereby preventing interference. As that stalk moves to the measuring station directly below center of disk 33, further rotation of disk 33 causes its roller 66 to drop off track 67. Continued rotation causes, of course, each successive roller to drop off track 67. It is to be noted that the end of track 67 is positioned to allow this drop off to occur some 4 degrees before each rod 32 becomes vertically disposed. At this point, yoke 32 is almost directly over the stalk in basket 12, and it therefore drops down, with flexible band 35 contacting the respective stalk, as previously explained.

It may be noted that the raising of the sizing rods 31 by track 67 will also cause measuring rod 42 and ratchet pawl 44 to be operated. However, as previously described, reset cam 54, shown in FIG. 6, contacts surface 46 on each pawl 44 just as each roller 66 (FIG. 10) drops off track 67, thereby releasing the ratchet on the respective rod 42. The sizing arm is then in readiness for the next measurement.

Having described a basic embodiment of my invention, I now turn to advantageous improvement in the sorting phase that is within the scope of my invention. Celery stalks, due to the shape of the individual limbs, are normally large near the butt end and taper toward the leafy end. In the process of packing such stalks in cartons or containers, it is highly desirable to alternate the layers of stalks so that the stalks will pack more evenly, and so that the number of stalks per crate will be more uniform for a specific size group. It is to this end that I have provided auxiliary memory and control apparatus to effectively sort each of the intermediate sizes, 2, 2½ and 3, into two separate groups for each size. That is, I provide two collection stations for size 2, hereinafter referred to as 2A and 2B; two stations for size 2½, hereinafter referred to as 2½A and 2½B; and two stations for size 3, hereinafter referred to as 3A and 3B. Similarly, I provide a separate conveyor belt or the like for each collection station. As a result, I obtain sorted stalks of the same size group on two separate conveyor belts, which two belts can be effectively used in the depositing of stalks in containers such that the butt ends are reversed in alternate layers. Although precise details of the means whereby containers can be automatically rotated 180° in timed relation to other facets of the mechanization are beyond the scope of the present invention, additional memory and control means as well as additional sorting apparatus are within the scope of the present invention, and will be described in detail hereinbelow.

I have found that it is desirable to allow a spacing between collection stations of say 6 basket spacings to provide space along the conveyor 10 for the kick-off conveyor belts or other packing facilities. Accordingly, and with particular reference to FIG. 11, a preferred set of locations for collection stations in the configuration under discussion is as follows:

| Size | Station |
| --- | --- |
| 1½ | S-4 |
| 2A | S-13 |
| 2B | S-19 |
| 2½A | S-25 |
| 2½B | S-31 |
| 3A | S-37 |
| 3B | S-43 |
| 4 | S-51 |

As may be readily seen, a sizing and memory wheel and associated control devices of the type previously discussed will not provide sufficient capacity for the range of delays necessary for proper spacing. Therefore I have provided auxiliary memory, timing and control devices to accommodate this extended range of delays.

Specifically, I have provided two auxiliary memory and control wheels and associated read-out switches that are similar in construction and operation to memory and timing device 50 shown in FIGS. 4 and 6. These wheels will be described fully hereinafter; however for purposes of preliminary explanation of the theory of operation of my alternative implementation, it will suffice to describe the devices as each consisting of a rotating disk or wheel similar to disk 33 in FIG. 4 and a stationary plate having air limit switches mounted thereon, similar to plate 51 in FIGS. 4 and 6. The wheels include resettable index devices that can be set to operate air limit switches mounted on the stationary plate as a wheel rotates the index device past the desired switch.

Figure 11:
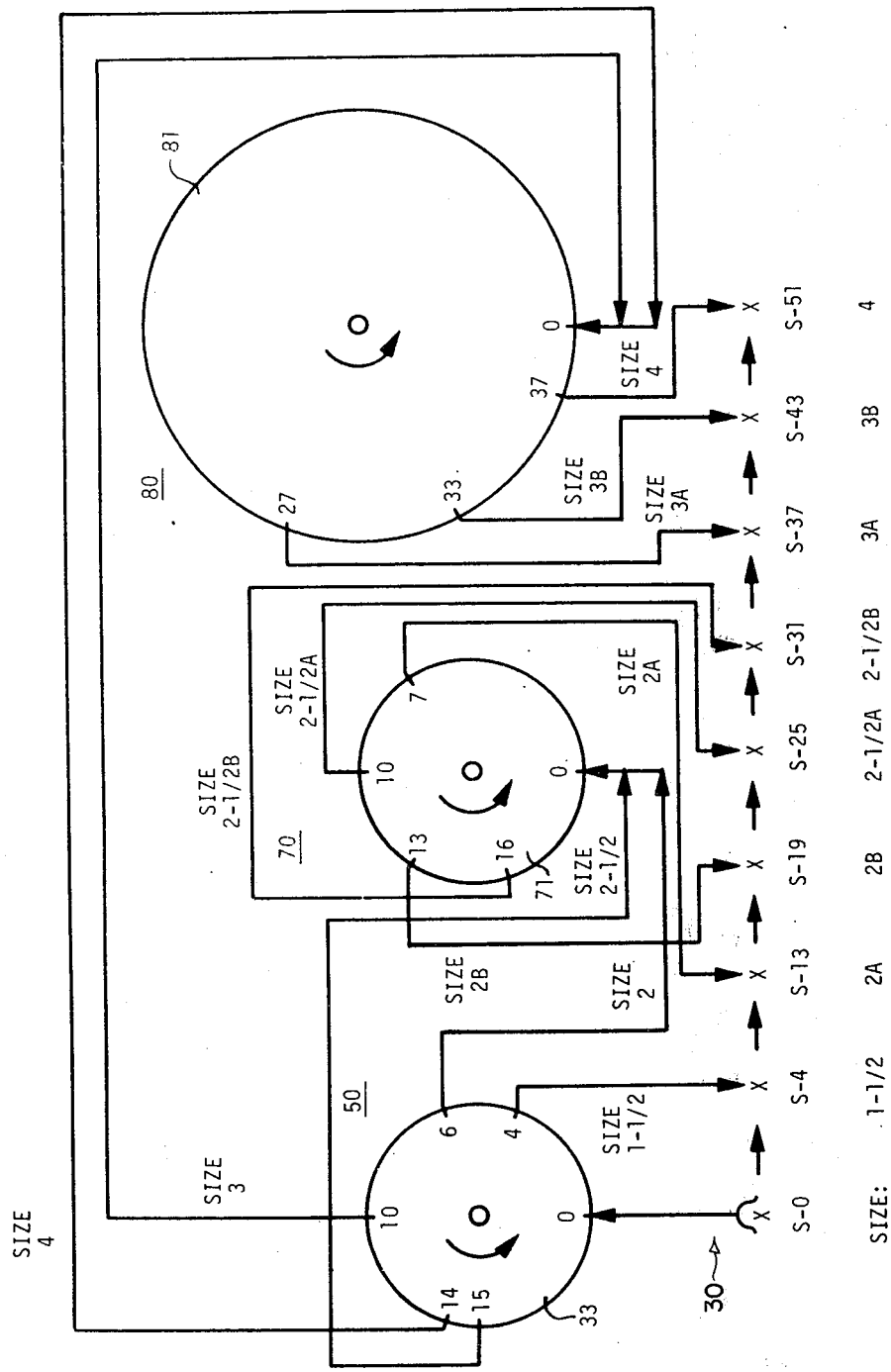
FIG. 11 is a schematic diagram of an alternative implementation of my invention, involving the use of additional memory and timing devices.

In FIG. 11, I have shown a schematic diagram of this additional apparatus connected to the memory and control device 50 previously described in detail, with the exception that I have in this implementation relocated the air limit switches 52 shown in FIG. 6. In FIG. 11 disk 33 is identical to that shown in FIG. 4. The stations or points shown (0, 4, 6, 10, 14, 15) refer to the fixed radial points on stationary plate 51 of FIG. 6 and represent the points where the air limit switches are now mounted. Identifying these stations with size groups; size 1½ produces an air pressure output at point 4; size 2 at point 6, size 2½ at point 15; size 3 at point 10; and size 4 at point 14.

Auxiliary memory and control means include: timing device 70 including disk or wheel 71 rotating at the same speed and in predetermined synchronous relationship with wheel 33; and timing device 80 including disk or wheel 81 rotating at one-half the speed of wheel 33 and in a precisely timed relationship therewith. Wheels 71 and 81 also include indexing means described hereinafter for temporarily storing the information contained in air pressure signals received from timing device 50 and for passing such signals on to the appropriate kick-off ram at the exact time required. Timing devices 70 and 80 also include stationary plates with air limit switches mounted thereon; such switches being operated by the index devices as required. In the schematic of FIG. 11, the numbered points around wheels 71 and 81 represent the fixed radial mounting points of the air switches. The stations S-0 through S-51 represent, of course, the collecting stations along the conveyor belt.

The operation of the system shown in FIG. 11 is best explained by taking a specific example. Assume, for example, that the conveyor has carried a stalk to station S-0, the stalk is measured as previously described and falls within size group 2. Wheel 33 stores this size group information and rotates ccw as indicated, such storage being, of course, in the form of the measuring rod being held in the proper position by its ratchet and cam arrangement. As the wheel rotates and moves the measuring rod past point 6, the air switch at that point operates placing an air-pressure signal on its output line, labeled "Size 2". This air pressure is transferred to wheel 71 at point 0, setting a size 2 index device on wheel 71. Thus, it may now be seen that the size measurement made at station S-0 has been stored for a selected period, the information then read out and transferred to wheel 71 and re-stored. Wheel 71 rotates ccw, carrying the set size 2 index. It is now important to note that I have provided two indexes for size 2 and therefore there are two size 2 air switch read-outs; one at point 7 and a second at point 13. An output at point 7 is designated "Size 2A" and an output at point 13 is designated "Size 2B".

Returning to the example, assume that the index for size 2A was set as described. At the time wheel 71 moves the 2A index past the air switch at point 7, the swich will operate placing air pressure on the "Size 2A" line. This pressure is transmitted to the kick-off air ram at conveyor station S-13, operating the ram which removes the stalk from the conveyor. It may now be seen that from the time of measurement of the stalk at S-0, 6 units of time delay occurred from device 50 and 7 units of delay from device 70 for a total of 13 units of time delay. These delay units, as previously described are precisely the time for the conveyor to move a stalk from one conveyor station to the next. Therefore, the exemplary stalk measured at S-0 will have moved to station S-13 during this 13 unit delay period and will be kicked off by the ram at S-13.

As mentioned heretofore, it is desirable to have several stalks of a given size kicked off at a first collecting station followed by several stalks of the same size kicked off at a second collecting station. For example, a group of 6 stalks is particularly advantageous. To this end, I have therefore provided means associated with wheel 71 to alternately set 6 index devices for size 2A followed by setting 6 index devices for size 2B, and so on. This means will be fully explained hereinafter. When a 2B index device is set, wheel 71 must rotate to point 13 to engergize the air switch at this point. This air pressure output on the "Size 2B" line energizes the kick-off ram at collecting station S-19. Note that the 6 units of delay from device 50 and the 13 units of delay from device 70 total 19 units, corresponding to movement of an exemplary stalk from S-0 to S-19. As can now be seen, groups of 6 size 2 stalks will be collected alternately between stations S-13 and S-19. Means are also provided to alternate setting of index devices for size 2½A and 2½B. While the above example was concerned with size 2 stalks, it is readily apparent that size 2½ stalks will thus be alternately collected at stations 25 and 31.

Timing device 70 will not accommodate the necessary delays for the desired stations S-37, S-43 and S-51. Therefore, I have provided timing device 80 for this purpose. Wheel 81 turning at one-half the speed of wheel 33 utilizes the same type of index devices for information storage as wheel 71 and means for alternating setting of index devices.

Stationary air switches are mounted at points 27, 33 and 37 with points 27 and 33 associated with size 3A and 3B respectively, and point 37 associated with size 4.

One may now note that the measurement of a size 3 stalk by wheel 33 will cause an air pressure read out at point 10 on that wheel after a 10 unit delay. This pressure will set, for example, index device 3A on wheel 81. After a 27 unit delay the index will produce an air pressure output on the "Size 3A" line (point 27) for a total delay of 37 units. This air pressure thus kicks off the stalk that has just arrived at collection station S-37. It is to be understood that indexes 3A and 3B will be set in alternate groups as described above for 2A and 2B on wheel 71. These groups will therefore be alternately collected at stations S-37 and S-43. Size 4 stalks need only one kick-off station and the combination of the 14 unit delay in device 50 and the 37 unit delay in device 80 provides a kick-off at station S-51.

Figure 12:
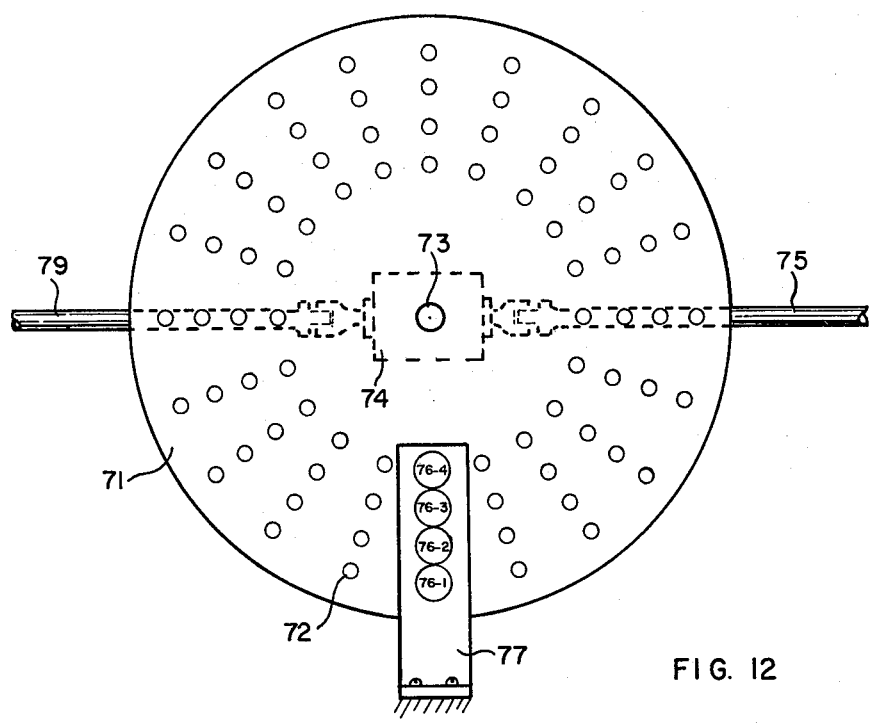
FIG. 12 is a front view of a auxiliary memory and timing wheel.

Having now explained the principle of my auxiliary memory and control devices with the aid of the schematic diagram of FIG. 11 and certain specific examples, I will now show in detail a preferred implementation of this alternate version of my invention. FIGS. 12 and 13 are front and side view respectively of timing and auxiliary memory device 70.

It should be kept in mind that timing and secondary memory device 80 is similar in construction to device 70, differing only in size, speed of rotation, and number of outputs. Therefore, the description of device 70 is, for all intents and purposes, also a description of device 80.

Device 70 comprises a memory disk 71 rotating counterclockwise, as indicated by the curved arrow. Disk 71 is mounted on shaft 73, as shown in FIGS. 12 and 13, and is driven by gearbox 74 and drive shaft 75 at the same rotary speed as disc 33. It will be recalled from the description of FIG. 2 that an ancillary output from gearbox 23 was provided to a shaft 75, which is of course the same shaft 75 to be seen in FIG. 12, and indicated in FIG. 13. In this way, therefore, motor 21 provides rotation to each of these rotary components, as well as to the conveyor 10, thus simplifying the task of keeping them operating in the desired synchronous relationship with each other.

FIG. 12 reveals disk 71 to contain eighty index pegs 72, arranged in four concentric circles, with there being four pegs on each of twenty radial lines. A bracket 77 supports four spring-return air rams 76-1 through 76-4 positioned to contact memory pegs 72 at point 0. This action is more clearly revealed in FIGS. 13 and 14. As shown, each peg 72 is disposed in a bushing 95 threaded into disk 71. Each peg may be in either of two positions, and is held firmly in either position by spring 92 resting in one or the other of the grooves in peg 72. Ram 76, upon receiving an air pressure signal, drives disk 93 in the direction shown by the arrow in FIG. 14, pushing peg 72 to its IN or ON position. The withdrawn position represents OFF.

Returning to FIG. 13, it is to be seen that the two lower rams 76-1 and 76-2 are associated with stalk size group 2, and the two upper rams 76-3 and 76-4 are associated with stalk size group 2½. Directly behind disk 71, stationary plate 78 provides bearing 97 to support shaft 73; however, the primary purpose of this plate is to provide a mounting for a series of pneumatic limit switches 98-1 through 98-4, with one switch being provided for each of the four concentric circles of pegs 72 on disk 71. As disk 71 rotates, a peg 72 in its IN or ON position will contact and close its associated switch 98 as the peg 72 is moved past the switch 98. If the peg 72 is in its OUT or OFF position, it does not operate the switch 98. Therefore, each peg 72, by its position with respect to retention spring 92, serves as a memory storage as to whether a signal was received for its location, and the time of rotation from its position opposite ram 76 to its switch 98 position serves as a timing device. A reset plate or cam 96 shown in end view in FIG. 13-A automatically resets all pegs 72 to their OUT position as disk 71 rotates past a certain position; note FIG. 17 in this regard.

In FIG. 12, an output drive shaft 79 may be noted to extend from gear box 74. This drive shaft is utilized to drive auxiliary memory wheel 81 through a gear box similar to gear box 74. However, the gear ratio is selected to turn wheel 81 at one-half the speed of wheel 71.

As indicated hereinabove, it is desired to alternately store groups of air signals from primary memory disk 33 for certain size groups between two sets of memory means in device 70. FIG. 15 illustrates one of the devices 120 for accomplishing this advantageous function. I have shown for illustrative purposes, counter and switch device 120-1 associated with group size 2. It is to be understood, of course, that identical apparatus is utilized for size 2½ and size 3, identified as 120-2 and 120-3 respectively. Plate 121 will be seen in FIG. 15 to support the elements of the counter and switch device 120-1. A 12-tooth ratchet wheel 122 has a concentric 180° cam plate 123 attached and pivoted at point 127. Spring 126 maintains tension on ratchet 122, which prevents rotation in the clockwise direction. Spring return ram 112-1 has a pawl 124 shown in its normal position in FIG. 15. Spring 125 holds pawl 124 against ratchet wheel 122. Cam 127 contacts the roller arm of single pole, double throw air switch 111-1 shown in its operated position. When switch 52-2 at point 6 on memory wheel 33 (see FIG. 11) closes, pressure is applied to air ram 112-1 and via switch 111-1 to air ram 76-1 associated with size 2A; see FIGS. 12 and 13. Ram 112-1 then extends, moving pawl 124 to the position shown by the dotted lines in FIG. 15. When switch 52-2 opens, ram 112-1 retracts, moving ratchet wheel 122 one notch counterclockwise as indicated by the arrow. Ram 76-1 sets the memory peg 72 opposite it at the time it operates from switch 111-1.

After a sufficient number of air pressure signals from switch 52-2 to cause ratchet wheel 122 to rotate cam 123 to its low side, the roller arm of switch 111-1 will extend, reversing switch 111-1, directing the next pressure signal to air ram 76-2 associated with size 2B. As may be easily seen, the next six pressure signals from switch 52-2 will cause air ram 76-2 to set its associated memory pegs 72 for the size 2B line, and simultaneously advance ratchet wheel 122 six notches. Cam 123 will again operate switch 111-1 to cause the next six pressure signals from switch 52-2 to operate ram 76-1 as previously described. While I have preferred to alternate groups of 6 stalks between two collection stations, it is to be understood that other numbers can be selected by changing the number of teeth in ratchet wheel 122 and the shape of cam 123.

An alternative method to the mechanical counter and switch 120 just described is a counter and switch utilizing fluidic logic devices. Such devices are manufactured by Double A Products Co., a subsidiary of Browne and Sharpe Manufacturing Company. A list of fluidic logic devices useful for building a fluidic counter and switch are as follows:

| Device | Model No. |
| --- | --- |
| Visi-Logic Element | FLB-N8-AL |
| Subplate | P645 |
| Connector Fittings | FCF |
| Tubing Kits | FLT |
| Brass Fittings | FLA |
| Terminal Strips | FTS |
| Resistors | FLR |
| Interface Elements | FLICR - 30A2, FLICR - N-10B2 |
| Frame Kits | FMK |

The Visilogic basic logic element is a NOR gate operated by air pressure on the order of 3 psi. As stated by the manufacturer on page 3 of Bulletin No. P-14055, devices that can be implemented with any type of logic element can be built up using their components. While the design and construction of a counter and switch using these fluidic logic devices is outside the scope of my invention and can be obtained on order from Browne and Sharpe Manufacturing Co., I will show a block diagram of such a counter and switch device 130 in FIG. 15-A.

For example, I illustrate device 130-1 associated with group size 2. Rams 76-1 and 76-2 are driven via AND gates 132 and 131 respectively by air pressure from switch 52-2. The AND gates are enabled alternately by outputs from counter 134. Counter 134 will have air pressure output on either line P or line Q. Assume for example that this output has just changed from line Q to line P. This output enables gate 131 and maintains gate 132 in its OFF condition such that the next pressure signal from switch 52-2 operates ram 76-2 and advances counter 134 one count. After a total of 6 such counts, pressure output from counter 134 changes from line P to line Q, cutting off gate 131 and enabling gate 132. Therefore, the next 6 air signals will operate ram 76-1 in accordance with this feature of my invention.

It is to be understood that counter 134 and gates 131 and 132 can be fabricated to specifications by Browne and Sharpe Manufacturing Company as a packaged unit complete with interface units to couple the high and low pressure devices. While this alternative counter and switch 130 is more expensive than my mechanical device 120, it is highly reliable, having no moving parts, and is ideally suited for operation in the environment encountered in packing plants.

Having now described the storage of size signals by means of pegs 72, I will show by reference to FIG. 16 how the stored signals are read out for operation of kick-off rams 62. Air switch 98 mounted on plate 78 controls its associated kick-off ram. As disk 71 rotates, a peg 72 moves in the direction indicated by the arrow and, after the desired time delay, contacts blade 99, closing switch 98. The unoperated position of blade 99 is shown by the dashed lines. For the case where peg 72 is in its OUT or OFF position, it can be seen that switch 98 would not be closed. It is an important feature of my invention that blade 99 remains in contact with peg 72 when in its IN position for a short period of time rather than making a momentary contact. This feature is used in a novel fashion to ensure synchronization in the kickoff operation, as will be more fully explained hereinafter.

Figure 17:
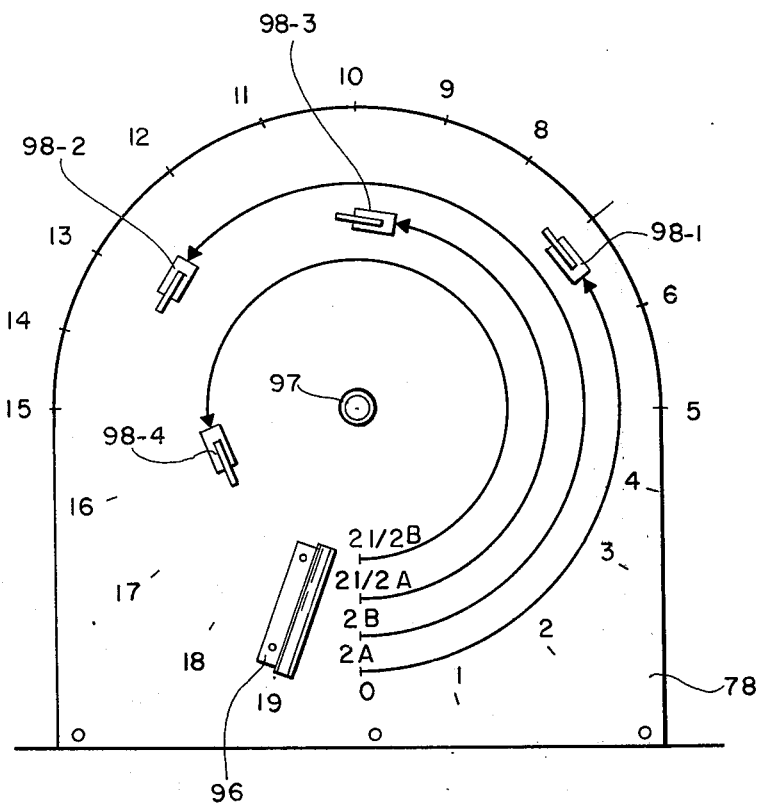
FIG. 17 is a front view of stationary timing and readout plate showing the locations of readout switches.

To better understand how the required time delay is achieved, refer now to FIG. 17. Stationary plate 78 is shown with points 0 to 19 indicated by the radial lines. The double size groups are identified as 2A and 2B, on the two outer rings; and 2½A and 2½B on the two inner rings. The output switch 98-1 for size 2A is mounted at staton 7, therefore, a peg 72 in the outer ring set at point 0 will rotate along the 2A arc until it reaches station 7 where it will operate switch 98-1. Similarly, a peg 72 set in arc 2B will rotate to point 13 to contact its switch 98-2, and so on. As disk 71 (FIGS. 12 and 13) rotates, pegs 72 after passing point 18 will contact reset cam 96 having a sloping surface that pushes all pegs 72 to the OUT position.

As previously described, an air signal from a read-out switch is utilized to control the kick-off ram at the desired collection station. It is clear that this operation must be carefully synchronized so that the ram contacts the top end of the celery stalk on the center line of its basket. If this operation were either early or late, damage to the stalk, ram or basket could occur. Therefore, I advantageously make use of a novel structure illustrated in FIG. 18 to ensure that ram 62 is energized only when center line of basket 12 is exactly opposite the center of ram plate 65.

Figure 18:
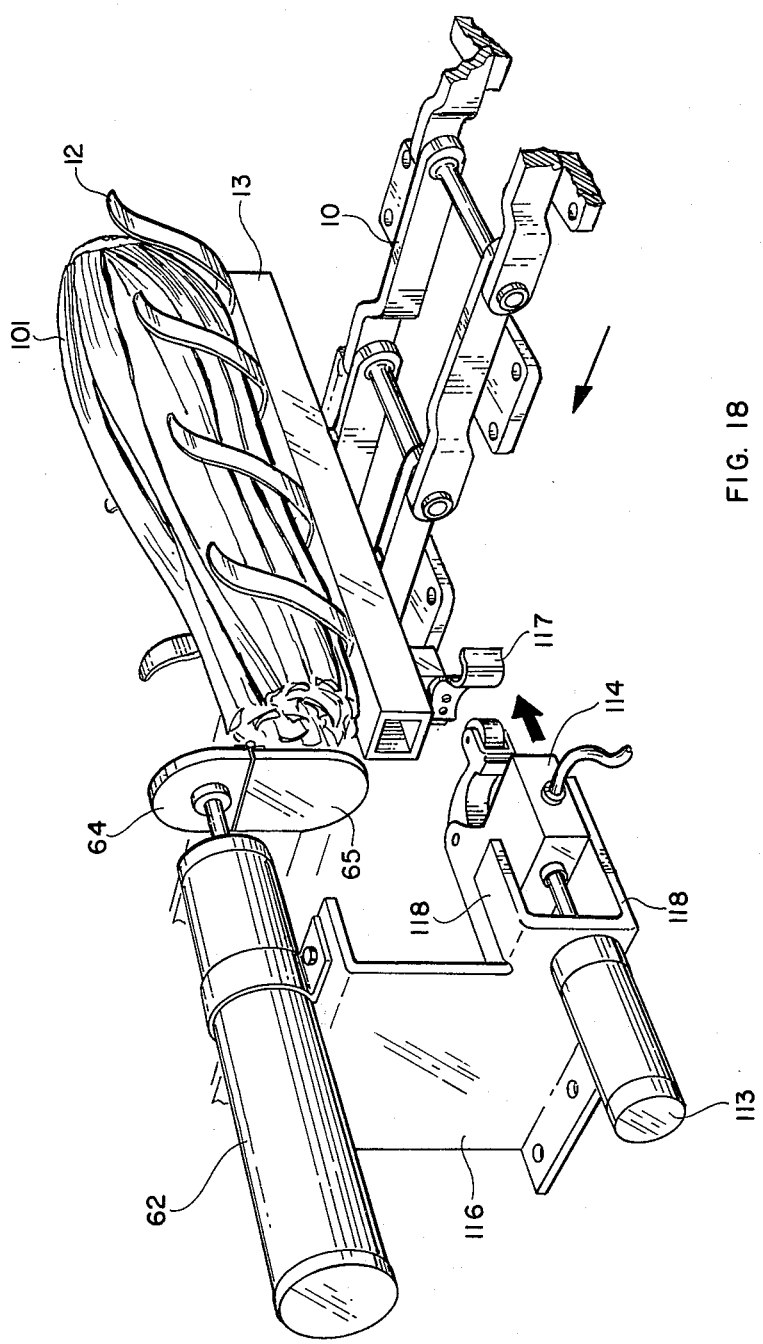
FIG. 18 is a perspective view of a typical stalk kick-off station showing kick-off ram, a celery stalk disposed in its basket, and the synchronization apparatus.

As may be realized, the normal slack or play in the various mechanical linkages in conveyor 10, memory discs 33 and 71 and actual positions of baskets 12 can result in the signal from air switches 98 (FIG. 17) not being accurately timed. In FIG. 18, a spring-return air ram 113 is mounted on bracket 116. The piston of ram 113 is attached to roller-actuated air switch 114 that is slidably disposed between guide tabs 118 of bracket 116. When ram 113 is actuated, switch 114 is moved to its extended position in the direction of the arrow. A schematic diagram shown in FIG. 19 may also be noted to illustrate the operation of my synchronization device.

Figure 19:
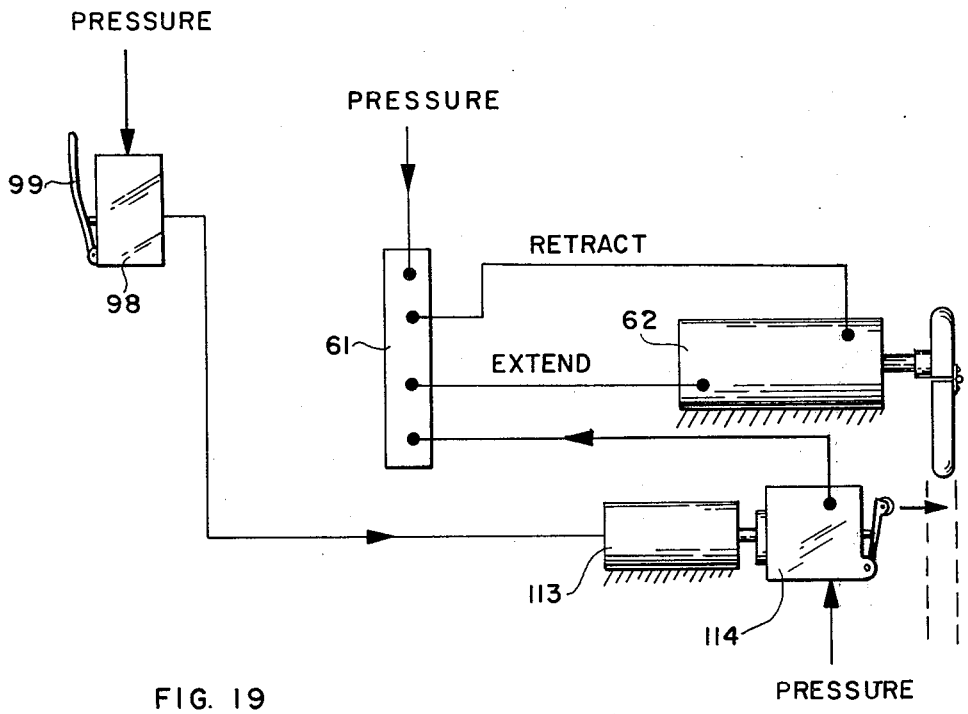
FIG. 19 is a schematic diagram of the devices utilized in connection with the operation of the kick-off ram.

Blade 99 of switch 98, as earlier mentioned, is contacted by a peg in its IN position. Switch 98 is closed slightly ahead of the arrival of the stalk 101 in basket 12 at the kick-off station. As described above, air pressure from switch 98 operates air ram 113 moving switch 114 to the extended position indicated by dotted lines. Since the blade 99 is designed to remain in contact with the peg for a brief period of time, switch 114 is held extended for that period. As the basket arrives on station, cam 17 attached to basket cross bar 13 in FIG. 18 momentarily contacts the roller of switch 114. FIG. 19 reveals that this action applies pressure to air pilot valve 61, energizing the extend port of kick-off ram 62. As may be seen, cam 117 is easily adjusted so that ram 62 is energized at the exact center line position of basket 12, thereby achieving the desired synchronization. As soon as cam 117 passes switch 114, pilot valve 61 retracts ram 62. Summarizing, ram 113 serves to "set" the kick-off station in response to an extended timing signal and the arriving basket 12 then itself triggers the kick-off ram 62.

As mentioned hereinabove, auxiliary memory timing and control device 80 is similar to the just described auxiliary memory, timing and control device 70. The significant difference between device 80 and device 70 is size, number of memory pegs and speed of rotation of memory disc. To relate device 80 and device 70, I list the following common items:

| Item | FIG. Nos. | Call-out Nos. |
| --- | --- | --- |
| Memory Peg Assy | 16 | 72, 92, 95 |
| Air Ram Assy | 13, 14 | 76, 93 |
| Pneumatic Switch | 17, 16 | 98, 99 |

The memory disk 81 for device 80 is somewhat larger than corresponding disk 71 for device 70, and contains 120 memory pegs 72 arranged in three concentric rings, and having 40 radial lines of pegs 72. Three air rams 76 are mounted on a bracket similar to bracket 77 in FIG. 12, and used to set their associated pegs 72. The disc 81 of device 80 rotates at one-half the speed of disk 71 and disk 33 thus providing delays of up to 39 units. The two outer rings of pegs 72 on the disk 81 are associated with the size 3 group and the inner ring with the size 4 group. Disc 81 is driven by a gear box coupled to gear box 74 shown in FIG. 12 by means of drive shaft 79. The gear ratios are selected to achieve the required one-half speed compared with speed of disc 33.

The pneumatic switches 98 with blades 99 for the signal read out function for device 80 are mounted on a fixed, stationary plate similar to plate 78, FIG. 17, but having a greater area to correspond with the larger disk 81. Switches 98 are mounted at points 27 and 33 for size 3 read out and point 35 for size 4 in accordance with the schematic diagram in FIG. 11. A peg reset cam plate similar to plate 96 in FIG. 17 is mounted at point 39 to reset all pegs 72 after read out.

Figure 20:
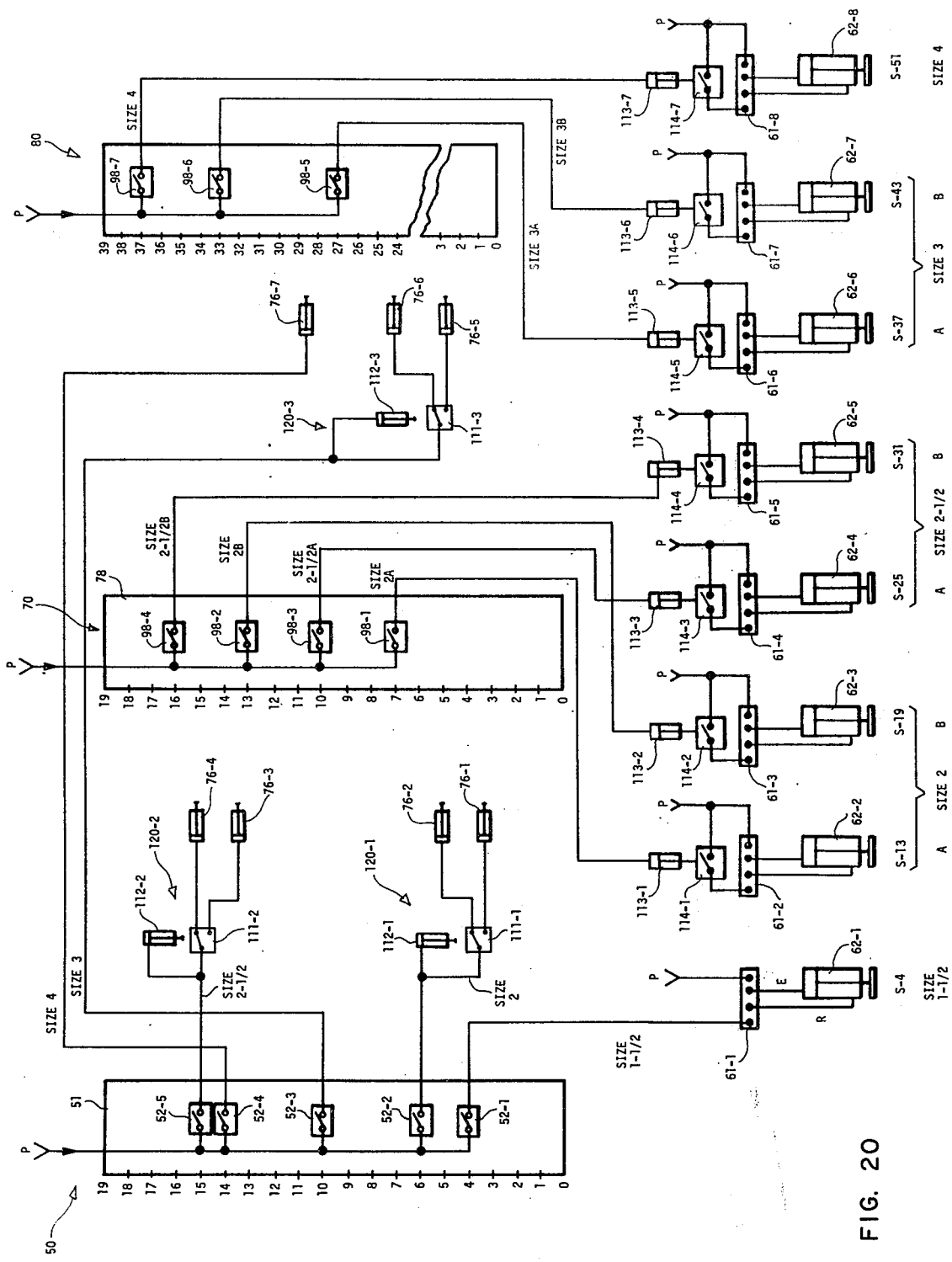
FIG. 20 is a complete schematic diagram of the air operated devices in the alternative implementation of my invention, such that sorting into five basic sizes can be accomplished.

Having now described each element of my additional memory and timing devices, I will now show a schematic diagram of the complete pneumatic system of a sorting apparatus utilizing my improved apparatus that provides two collection stations for each of three intermediate stalk size groups. In FIG. 20, I have shown plate 51, plate 78 and the plate for device 80 schematically with the points located on their circular periphery here indicated linearly for clarity purposes. For example, plate 51 has 20 points (0 to 19) with the signal read-out air switches located at points 4, 6, 10, 14 and 15. In accordance with the principles of my invention, these switches are closed momentarily by the memory storage cam with a different fixed delay for each measurement as described fully hereinabove.

The sequence of operations of the system in FIG. 20 will be set forth with the assistance of FIG. 21. The first column of the table in FIG. 21 lists the devices in their order of operation. The next eight columns list the device dash numbers from FIG. 20 for each sorting group, and the last column describes briefly the operation of each device. I will now explain more fully the operation of an exemplary case with the understanding that the operation for all other cases can then be noted by following down each column and referring to FIG. 20. For the example, I choose to use the 2B size group.

When read out air switch 52-1 at point 6 on plate 51 is closed momentarily in response to the delayed measurement of a size 2 stalk, air pressure from supply P is applied via two-way air switch 111-1 for example to air ram 76-2, ram 76-2 extends momentarily setting its associated peg in the IN or ON position. Simultaneously, the air pressure momentarily extends ratchet wheel ram 112-1, advancing its cam 127 (FIG. 15) one step. After a series of 6 steps of the ratchet wheel 122 and simultaneously setting 6 pegs associated with size group 2B; cam 127 switches the output of switch 111-1 to ram 76-1. Thus, the next 6 air signals will cause 6 pegs associated with size group 2A to be set, in accordance with the principle of my improved sorting device.

Turning now to plate 78, FIG. 20, the setting of the size 2B peg at point 0 results in a brief closure of read-out air switch 98-2 after the delay period associated with point 13 on plate 78. This brief closure of switch 98-2 provides air pressure to air ram 113-2 at collection station S-19. Air ram 113-2 extends, moving air switch 114-2 into its forward position to be tripped by the moving stalk basket cam as it reaches the center line of kick-off air ram 62-3. As switch 114-2 is thus momentarily closed, it directs air pressure to air pilot valve 61-3, admitting air pressure to the extend port of ram 62-3, which extends. As switch 114-2 opens, air pilot valve 61-3 causes ram 62-3 to immediately retract. As previously described, this action kicks off a size 2 stalk from its basket.

As may be noted from FIG. 21, the sequence of devices used for sizes 2A, 2B, 2½A, 2½B, 3A and 3B are identical. Size 1½ does not require extra memory, and due to its short delay, air pilot valve 61-1 and kick-off air ram 62-1 can be operated directly from the read-out switch 52-1. Size 4 stalks are sorted into one group only and therefore do not require the devices associated with the alternation of memory storage required for the sizes sorted into two groups.

While I have described certain preferred implementations for my invention, it is to be understood that many alternative arrangements obvious to those skilled in the art fall within the scope of my invention. The exemplary embodiments shown and described have been primarily applicable to the sizing of celery stalks, but it is clear that my invention is equally applicable for use in connection with other plants or for that matter, for use with a wide range of articles that are to be sized and/or sorted into various size groups.

I claim:

1. A device for automatically sizing loosely formed articles such as celery stalks or the like into a plurality of size groups without damage thereto, comprising a measuring station, conveying means mounted for movement past said measuring station, article holders disposed at spaced intervals along said conveying means and movable therewith, article sizing means at said measuring station, said sizing means having a plurality of arms, each of said arms including a pliable, inextensible contact surface whereby said contact surface can partially conform to the shape of such articles without damage to such articles, with the operation of said sizing means being timed to coincide with the speed of said conveying means such that each article held in said holders can be physically contacted by said contact surface of one of said arms, the latter operation being utilized to determine the size group to which each article moving in said holders belongs, control means at said measuring station operatively connected to said article sizing means, and article removal means for causing the removal of such articles from said article holders at a plurality of locations along said conveying means, said removal means being connected to and operated by said control means, such that the removal of articles from said holders can be accomplished at preascertained locations in accordance with their physical size.

2. The device as defined in claim 1 in which said sizing means includes retaining means for temporarily retaining each of said arms in one of a plurality of selected radial inward positions corresponding to pre-established size groups, with such position thereafter determining at which of said collecting stations the article is to be removed.

3. The sizing device as defined in claim 1 in which said article sizing means is a wheel-like member having said plurality of arms arranged in a spokelike manner around the center of said member, said wheel-like member arranged to rotate so that said contact surface of one of said arms contacts an article in said holder as each of said holders moves past said measuring station, spring bias means connected to said arms and biasing said arms in a radially-outward direction, and being individually arranged to retreat in a radially inward direction for a distance consonant with the size of the article encountered, with the distance of such retreat determining at which of said collecting stations articles of each size group are removed, said spring bias means also serving to cause said pliable contact surface to partially compress such articles, thereby increasing the accuracy of the sizing operation.

4. The device as defined in claim 3 in which said control means includes memory means utilized in concert with the operation of said article sizing means in order to enable a sorting operation to be performed, said memory means making possible the storage of a representation of the size of a given article in a given holder of the conveying means, said memory means causing said control means to actuate said removal means at such time as to cause such article to be selectively removed from said conveying means at a collecting station appropriate to the size group of such article.

5. The device as defined in claim 3 in which said control means includes a plurality of pneumatic switches mounted on a fixed plate parallel to and adjacent said wheel-like member, the number of said switches being equal to the number of such size groups, with a central point of said plate being in line with the axis of said wheel-like member, each of said switches mounted on a different radial line and each at a different radial distance with respect to said central point, the position of each of said radial lines being selected to cause the switch mounted on such line to be operated by an upper portion of said arm at the time such articles sized by said arm arrives at the collecting station appropriate for its size, such switch operation thereby controlling said removal means whereby said control means is safely operable in presence of washing water, spray, moisture and general wet conditions.

6. The device as defined in claim 5 in which said removal means comprises an air-pressure-operated ram operatively connected to one of said switches and having a piston arm, whereby, upon operation, said piston arm of said ram contacts and ejects such article from its holding means, and whereby said removal means is safely operable in a wet environment.

7. A device for automatically sizing celery stalks or similar articles into a plurality of size groups without damage thereto, comprising a measuring station, an endless conveying means mounted for movement past said measuring station, article holders disposed at spaced intervals along said conveying means, and movable therewith, article contacting means at said measuring station, with the contact operation of latter means being timed to coincide with the speed of said conveying means so as to contact each article held in said holders, such operation being utilized to determine the size group to which each article moving in said holders belongs, principal control means at said measuring station operatively connected to said article contacting means, a plurality of collecting stations disposed at intervals along the path of travel of said conveying means and beyond the location of said measuring station, said collecting stations including at least one pair of said stations associated with a given size group, removal means associated with each of said collecting stations, said removal means arranged for collecting articles belonging to such size group on a periodically alternating basis for each collecting station of said pair, said removal means connected to and operated by said principal control means.

8. The device defined in claim 7 in which said removal means includes auxiliary control and memory means operatively connected from said principal control means and operatively connected to at least said pair of collecting stations, whereby said auxiliary control and memory means causes articles belonging to such size groups associated with said pair to be removed alternately at each of said pair of collecting stations.

9. The device defined in claim 8 in which said auxiliary control and memory means is operatively connected to said removal means at least at one pair of said collecting stations associated with one such size group.

10. The device as defined in claim 9 in which said auxiliary control and memory means includes switching means, said switching means causing articles belonging to such size group having said pair of collecting stations to be collected from said pair of collecting stations alternately.

11. The device as defined in claim 8 in which said auxiliary memory means includes a rotating disk arranged to rotate in a fixed phase relationship with said wheel-like member, said rotating disk having at least one index device capable of being set in one of two positions whereby one of said positions represents an OFF position and the other such position represents an ON position, said index devices rotating with said disk.

12. The device as defined in claim 11 in which said auxiliary control means includes at least one pneumatic switch mounted on a fixed plate parallel to and adjacent to said rotating disk, whereby said switch is operated by said index device when in its ON position as said rotating disk moves said index device past said switch, and said switch is not operated by said index device when said index device is in its OFF position.

13. The device as defined in claim 11 in which fixed actuating means are mounted adjacent to said rotating disk, said actuating means arranged to set said index device in its ON position in response to a control signal from said memory and control means when said disk rotates to a first selected position, and index reset means for setting said index device to its OFF position when said disk rotates to a second positon and at a time prior to an operation of said actuating means.

14. The device as defined in claim 13 in which said actuating means is an air-pressure-operated ram and said control means is a pneumatic switch, said pneumatic switch controlling air pressure to said ram.

15. A device for automatically sizing celery or other loosely limbed produce on a per volume basis rather than by weight comprising an endless conveying means mounted for movement past a measuring station, produce-receiving holders disposed at spaced intervals along said conveying means and movable therewith, said measuring station having produce-sizing means, with the operation of latter means being timed to concide with the speed of said conveying means, such that a proper size determination can be made of each piece of produce during its movement past said measuring station by physical contact of such produce by produce-contacting means, memory and control means, said memory and control means closely associated with said measuring station, such memory and control means being constructed and arranged such that the size of a given piece of produce as determined by said produce-contacting means will be registered in said memory means, a plurality of collecting stations disposed at spaced locations adjacent the subsequent path of travel of said conveying means, with there being at least one collecting station for produce of each size group with which said device is concerned, and means for removing produce from said conveying means at the collecting station appropriate for that size produce, so that over a period of time, all of the produce traveling along said conveying means will be collected at said collecting stations, said control means being caused by said memory means to selectively activate said produce removing means at whatever collecting station is appropriate for produce of that specific size and at least some sizes of produce being collected at two collecting stations, thus making possible for produce of a given size to be collected first at one station, and then at the other station, with the time interval thus provided being of sufficient length as to permit a reversal of collecting means, such that the direction of the stem ends in the collecting means is reversed on a layer-by-layer basis.

16. The sizing device as defined in claim 15 in which said memory and control means includes auxiliary memory and control means, said auxiliary control means subsequently controlling the activation of said produce removing means at said two collecting stations for at least one of such produce size groups.

17. The sizing device as defined in claim 16 in which said auxiliary memory and control means includes switching means, said switching means causing produce belonging to a size group having said two collecting stations to be alternately collected at said two collecting stations.

18. A device for automatically sizing celery stalks or similar articles into a plurality of size groups without damage thereto, compising a measuring station, an endless conveying means mounted for movement past said measuring station, article holders disposed at spaced intervals along said conveying means and movable therewith, a wheel-like sizing member having a plurality of spoke-like arms, said wheel-like member arranged to rotate so that the outer end of one of said arms contacts articles in said holders as each of said holders moves past said measuring station, each of said arms being spring biased in a radially-outward direction, and being individually arranged to retreat in a radially inward direction for a distance consonant with the size of the article encountered, with the distance of such retreat determining the size group to which each article moving in said holders belongs, control means at said measuring station operatively connected to said sizing member, said control means including memory means utilized in concert with the operation of said sizing member in order to enable a sorting operation to be performed, said memory means serving to store a representation of the size of a given article in a given holder of the conveying means, said memory means including retaining means for temporarily retaining each of said arms in one of a plurality of selected radial inward positions corresponding to pre-established size group, said retaining means comprising ratchet notches adjacent the inner end of each of said arms, said notches being spaced to correspond to such pre-established size groups, springloaded pawls disposed on said wheel-like member to engage said notches, thereby temporarily retaining each of said arms in an inward position as determined by the size of the article contacted, resetting means for disengaging each of said pawls from said notches prior to impending contact of each of said arms with subsequently presented articles, a plurality of collecting stations disposed at preascertained intervals along the path of travel of said conveying means, beyond the location of said measuring station, with each collecting station being associated with a size group different from that of at least some of the other collecting stations, removal means associated with at least some of the said collecting stations, said memory means causing said control means to actuate said removal means at such time as to cause such article to be selectively removed from said conveying means at a collecting station appropriate to the size group of such article.

19. A device for automatically sizing celery stalks or similar articles into a plurality of size groups without damage thereto, comprising a measuring station, conveying means mounted for movement past said measuring station, article holders disposed at spaced intervals along said conveying means, and movable therewith, article sizing means including a pliable inextensible contact surface at said measuring station, with the sizing operation of latter means being timed to coincide with the speed of said conveying means so as to contact each article held in said holders, such operation being utilized to determine the size group to which each article moving in said holders belongs, principal pneumatic control means at said measuring station operatively connected to said article sizing means, a plurality of collecting stations disposed at intervals along the path of travel of said conveying means and beyond the location of said measuring station, with at least one pair of collecting stations being associated with a size group different from that of at least some of the other collection stations, and pneumatically operated removal means associated with each of said collecting stations, said removal means connected to and operated by said principal pneumatic control means, whereby each article is removed from the conveying means and collected at a location appropriate to its size group.

20. The method of performing an automatic sorting operation on items of produce carried at spaced locations on a moving belt past a number of stations that correspond to different sizes of the items being measured, comprising the steps of performing a physical size measurement of a selected dimension of each item carried on the belt by the use of an article-contacting device arranged to operate in timed relation with the items carried on the belt, sequentially storing a representation of the size of the measurement obtained for each item, conveying each item toward a pair of alternately utilized stations at which items of a given size are removed from the belt, with a first of such pair of stations being utilized for the removal of a selected number of items of the given size, following which the second station of such pair of stations then being used for the removal of a like number of items, with the first station and second station thereby utilized in an alternating manner, with the period that a given station of the pair is not in use being utilized for the re-orientation of the items last collected at such given station.

* * * * *